United States Patent
Guire et al.

(10) Patent No.: US 8,496,857 B2
(45) Date of Patent: *Jul. 30, 2013

(54) NANOTEXTURED SURFACES

(75) Inventors: Patrick E. Guire, Hopkins, MN (US); Kristin Taton, Little Canada, MN (US); Jie Wen, Eden Prairie, MN (US); Laurie R. Lawin, New Brighton, MN (US)

(73) Assignee: Innovative Surface Technologies, Inc., St. Paul, MN (US)

( * ) Notice: Subject to any disclaimer, the term of this patent is extended or adjusted under 35 U.S.C. 154(b) by 8 days.

This patent is subject to a terminal disclaimer.

(21) Appl. No.: 13/167,104

(22) Filed: Jun. 23, 2011

(65) Prior Publication Data

US 2011/0268973 A1 Nov. 3, 2011

Related U.S. Application Data

(63) Continuation of application No. 11/457,170, filed on Jul. 13, 2006, now Pat. No. 7,989,619.

(60) Provisional application No. 60/699,200, filed on Jul. 14, 2005, provisional application No. 60/807,143, filed on Jul. 12, 2006.

(51) Int. Cl.
*C08K 5/06* (2006.01)
*C08K 5/07* (2006.01)
*C08K 5/34* (2006.01)
*C08L 101/02* (2006.01)
*C08L 101/06* (2006.01)
*C07C 43/02* (2006.01)
*C07C 49/00* (2006.01)

(52) U.S. Cl.
USPC ........... 252/589; 252/407; 524/357; 568/303; 568/308; 568/325; 568/326; 568/329

(58) Field of Classification Search
USPC ................ 252/589, 407; 524/357; 568/303, 568/308, 325, 326, 329, 589, 407
See application file for complete search history.

(56) References Cited

U.S. PATENT DOCUMENTS

| | | | |
|---|---|---|---|
| 3,580,927 | A | 5/1971 | Wear |
| 3,959,078 | A | 5/1976 | Guire |
| 4,605,413 | A | 8/1986 | Urry et al. |
| 4,722,906 | A | 2/1988 | Guire |
| 5,002,582 | A | 3/1991 | Guire et al. |
| 5,202,361 | A | 4/1993 | Zimmerman et al. |
| 5,331,027 | A | 7/1994 | Whitbourne |
| 5,414,075 | A | 5/1995 | Swan et al. |
| 5,637,460 | A | 6/1997 | Swan et al. |
| 5,714,360 | A | 2/1998 | Swan et al. |
| 5,942,555 | A | 8/1999 | Swanson et al. |
| 6,077,698 | A | 6/2000 | Swan et al. |
| 6,096,369 | A | 8/2000 | Anders et al. |
| 6,278,018 | B1 | 8/2001 | Swan |
| 6,391,948 | B1 | 5/2002 | Clark et al. |
| 6,683,126 | B2 | 1/2004 | Keller et al. |
| 7,348,055 | B2 | 3/2008 | Chapa et al. |
| 7,772,393 | B2 * | 8/2010 | Guire et al. .................. 544/196 |
| 7,943,234 | B2 * | 5/2011 | Lawin et al. .................. 428/323 |
| 7,989,619 | B2 * | 8/2011 | Guire et al. .................. 544/196 |
| 2007/0009657 | A1 | 1/2007 | Zhang et al. |
| 2008/0021126 | A1 | 1/2008 | Dietliker et al. |

FOREIGN PATENT DOCUMENTS

| | | |
|---|---|---|
| JP | 57-042742 | 3/1982 |
| JP | 57-117564 | 7/1982 |
| JP | 59-043061 | 3/1984 |
| WO | WO 93/16131 | 8/1993 |
| WO | WO 98/03489 | 1/1998 |
| WO | WO 01/40367 | 6/2001 |

OTHER PUBLICATIONS

Allen, et al., "Photochemistry and Photopolymerization Activity of Novel 4-Alkylamino Benzophenone Initiators—Synthesis, Characterization, Spectroscopic and Photopolymerization Activity," European Polymer Journal, Pergamon Press, Ltd. Oxford, GB, vol. 26, No. 12, 1990, pp. 1345-1353, XP002393858.

Kroschiwitz, ed., "Plastics", Concise Encyclopedia of Polymer Science and Engineering, John Wiley & Sons, 1990, pp. 462-464.

* cited by examiner

*Primary Examiner* — Venkataraman Balasubramanian
(74) *Attorney, Agent, or Firm* — Fulbright & Jaworski, LLP; Scott D. Rothenberger

(57) ABSTRACT

The invention describes novel compositions that include a cross linking compound, a polymer and a 1 nm to about a 25 micron sized particle optionally with an oxide layer. In particular, the particle is a silica and one which has been pretreated with a silane.

16 Claims, No Drawings

NANOTEXTURED SURFACES

CROSS REFERENCE TO RELATED APPLICATIONS

This application is a Continuation of U.S. patent application Ser. No. 11/457,170, filed Jul. 13, 2006, entitled "Nanotextured Surfaces", and claims benefit under 35 U.S.C. §119 (e) to U.S. Ser. No. 60/699,200, entitled "Nanotextured Surfaces", filed Jul. 14, 2005 and 60/807,143, entitled "Nanotextured Surfaces", filed Jul. 12, 2006, the contents of which are incorporated herein by reference in their entirety.

FIELD OF THE INVENTION

The invention relates generally to super hydrophobic or ultra hydrophobic coatings that include a cross linker with photoactivatable groups, a polymer and a 1 nm to about a 25 micron sized particle, optionally with an oxide layer, such as a porous or non-porous silica. The compositions are useful as surface coating agents alone or in combination with other target molecules such as polymers, biomolecules and the like.

BACKGROUND OF THE INVENTION

There exist many ways to coat, adhere, adsorb, modify, etc. a surface with a material, such that the material changes the characteristics of the surface. For example, suitable coatings can be prepared that when applied to a given surface render the surface hydrophobic. In other instances, the coating may provide enhanced ability to bind with a target molecule, such as a protein.

In particular, there are known cross linking materials that include a latent reactive group, such as a photoactivatable group. The cross linking material has, in general, at least two photoactivatable groups, such that one group can be activated and attached to the surface of the substrate. The remaining latent group, can then later be, or simultaneously with the surface attachment, activated to react with a target molecule such as a polymer or a biomolecule.

Unfortunately, the cross linking materials themselves are generally not hydrophobic and thus lessen the hydrophobic nature of the treated surface.

Therefore, a need exists for coating compositions that include photoactivatable crosslinking groups that do not detract from the desired hydrophobic nature of the treated surface.

BRIEF SUMMARY OF THE INVENTION

The present invention surprisingly provides unique hydrophobic or ultra hydrophobic compositions that include a crosslinker with photoactivatable (photoreactive) groups, a polymer and a 1 nm to about a 25 micron sized particle, optionally having an oxide layer, such as a porous or non-porous particles including, aluminum oxides (alumina), titanium oxide, zirconium oxide, gold (treated with thiols), silver (thiol or silane treated), nickel, iron oxide, and alloys (all treated with silane), polystyrene particles, (meth)acrylates particles, PTFE particles, silica particles, polyolefin particles, polycarbonate particles, polysiloxane particles, silicone particles, polyester particles, polyamide particles, polyurethane particles, ethylenically unsaturated polymer particles, polyanhydride particles and biodegradable particles such as polycaprolactone (PCL) and polylactideglycolide (PLGA), and nanofibers, nanotubes, or nanowires. Generally inorganic particles, porous or non-porous, are pretreated with a silane to promote hydrophobicity.

One unique cross linking molecular family includes compounds having the formula:

L is a linking group. D is O, S, SO, $SO_2$, $NR^5$ or $CR^6R^7$. T is $(-CH_2-)_x$, $(-CH_2CH_2-O-)_x$, $(-CH_2CH_2CH_2-O-)_x$, $(-CH_2CH_2CH_2CH_2-O-)_x$ or forms a bond. $R^1$ is a hydrogen atom, an alkyl, alkyloxyalkyl, aryl, aryloxyalkyl or aryloxyaryl group. X is O, S, or $NR^8R^9$. P is a hydrogen atom or a protecting group, with the provisio that P is absent when X is $NR^8R^9$. $R^2$ is a hydrogen atom, an alkyl, alkyloxyalkyl, aryl, aryloxyalkyl or aryloxyaryl group. G is O, S, SO, $SO_2$, $NR^{10}$, $(CH_2)_t$—O— or C=O. $R^3$ and $R^4$ are each independently an alkyl, aryl, arylalkyl, heteroaryl, or an heteroarylalkyl group, or optionally, $R^3$ and $R^4$ can be tethered together via $(-CH_2-)_q$, $(-CH_2-)_r C=O(-CH_2-)_s$, $(-CH_2-)_r S(-CH_2-)_s$, $(-CH_2-)_r S=O(-CH_2-)_s$, $(-CH_2-)_r S(O)_2(-CH_2-)_s$, or $(-CH_2-)_r NR(-CH_2-)_s$. $R^5$ and $R^{10}$ are each independently a hydrogen atom or an alkyl, aryl, or arylalkyl group. $R^6$ and $R^7$ are each independently a hydrogen atom, an alkyl, aryl, arylalkyl, heteroaryl or heteroarylalkyl group. $R^8$ and $R^9$ are each independently a hydrogen atom, an alkyl, aryl, or arylalkyl group, R is a hydrogen atom, an alkyl group or an aryl group, q is an integer from 1 to about 7, r is an integer from 0 to about 3, s is an integer from 0 to about 3, m is an integer from 2 to about 10, t is an integer from 1 to about 10 and x is an integer from 1 to about 500.

In one aspect, L is a branched or unbranched alkyl chain having between about 2 and about 10 carbon atoms.

In another aspect, D is an oxygen atom (O).

In still another aspect, T is $(-CH_2-)_x$ or $(-CH_2CH_2-O-)_x$ and x is 1 or 2.

In still yet another aspect, $R^1$ is a hydrogen atom.

In yet another aspect, X is an oxygen atom, O, and P is a hydrogen atom.

In another aspect, $R^2$ is a hydrogen atom.

In still another aspect, G is an oxygen atom, O.

In still yet another aspect, $R^3$ and $R^4$ are each individually aryl groups, which can be further substituted, and m is 3.

In one particular aspect, L is

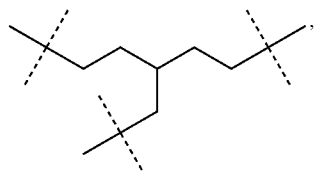

D is O, T is $(-CH_2-)_x$, $R^1$ is a hydrogen atom, X is O, P is a hydrogen atom, $R^2$ is a hydrogen atom, G is O, $R^3$ and $R^4$ are phenyl groups, m is 3 and x is 1.

In yet another particular aspect, L is $(-CH_2-)_y$, D is O, T is $(-CH_2-)_x$, $R^1$ is a hydrogen atom, X is O, P is a hydrogen atom, $R^2$ is a hydrogen atom, G is O, $R^3$ and $R^4$ are phenyl groups, m is 2, x is 1 and y is an integer from 2 to about 6, and in particular, y is 2, 4 or 6.

A second unique cross linking molecular family includes compounds having the formula:

L is a linking group. T is $(-CH_2-)_x$, $(-CH_2CH_2-O-)_x$, $(-CH_2CH_2CH_2-O-)_x$, $(-CH_2CH_2CH_2CH_2-$ O—)$_x$ or forms a bond. R$^1$ is a hydrogen atom, an alkyl, alkyloxyalkyl, aryl, aryloxyalkyl or aryloxyaryl group. X is O, S, or NR$^8$R$^9$. P is a hydrogen atom or a protecting group, with the provisio that P is absent when X is NR$^8$R$^9$. R$^2$ is a hydrogen atom, an alkyl, alkyloxyalkyl, aryl, aryloxylalkyl or aryloxyaryl group. G is O, S, SO, SO$_2$, NR$^{10}$, (CH$_2$)$_t$—O— or C=O. R$^3$ and R$^4$ are each independently an alkyl, aryl, arylalkyl, heteroaryl, or an heteroarylalkyl group, or optionally, R$^3$ and R$^4$ can be tethered together via (—CH$_2$—)$_q$, (—CH$_2$—)$_r$C=O(—CH$_2$—)$_s$, (—CH$_2$—)$_r$S(—CH$_2$—)$_s$, (—CH$_2$—)$_r$S=O(—CH$_2$—)$_s$, (—CH$_2$—)$_r$S(O)$_2$(—CH$_2$—)$_s$, or (—CH$_2$—)$_r$NR(—CH$_2$—)$_s$. R$^{10}$ is a hydrogen atom or an alkyl, aryl, or arylalkyl group. R$^8$ and R$^9$ are each independently a hydrogen atom, an alkyl, aryl, or arylalkyl group. R is a hydrogen atom, an alkyl group or an aryl group, q is an integer from 1 to about 7, r is an integer from 0 to about 3, s is an integer from 0 to about 3, m is an integer from 2 to about 10, t is an integer from 1 to about 10 and x is an integer from 1 to about 500.

In one aspect, L has a formula according to structure (I):

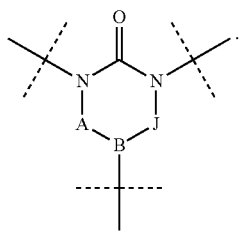

(I)

A and J are each independently a hydrogen atom, an alkyl group, an aryl group, or together with B form a cyclic ring, provided when A and J are each independently a hydrogen atom, an alkyl group, or an aryl group then B is not present, B is NR$^{11}$, O, or (—CH$_2$—)$_z$, provided when A, B and J form a ring, then A and J are (—CH$_2$—)$_z$ or C=O, R$^{11}$ is a hydrogen atom, an alkyl group, an aryl group or denotes a bond with T, each z independently is an integer from 0 to 3 and provided when either A or J is C=O, then B is NR$^{11}$, O, or (—CH$_2$—)$_z$ and z must be at least 1.

In another aspect T is —CH$_2$—.
In still another aspect, R$^1$ is a hydrogen atom.
In still yet another aspect, X is O and P is a hydrogen atom.
In still another aspect, R$^2$ is a hydrogen atom.
In yet another aspect, G is O.
In another aspect, R$^3$ and R$^4$ are each individually aryl groups.
In still yet another aspect, m is 3, and in particular, A and J are both C=O and B is N or A and J are both hydrogen atoms.

A third unique cross linking molecular family includes compounds having the formula:

L-((TGQR$^3$C(=O)R$^4$))$_m$.

L is a linking group. T is (—CH$_2$—)$_x$, (—CH$_2$CH$_2$—O—)$_x$, (—CH$_2$CH$_2$CH$_2$—O—)$_x$, (—CH$_2$CH$_2$CH$_2$CH$_2$—O—)$_x$ or forms a bond. G is O, S, SO, SO$_2$, NR$^{10}$, (CH$_2$)$_t$—O— or C=O. Q is (—CH$_2$—)$_p$, (—CH$_2$CH$_2$—O—)$_p$, —(CH$_2$CH$_2$CH$_2$—O—)$_p$ or (—CH$_2$CH$_2$CH$_2$CH$_2$—O—)$_p$. R$^3$ and R$^4$ are each independently an alkyl, aryl, arylalkyl, heteroaryl, or an heteroarylalkyl group, or optionally, R$^3$ and R$^4$ can be tethered together (—CH$_2$—)$_q$, (—CH$_2$—)$_r$C=O (—CH$_2$—)$_s$, (—CH$_2$—)$_r$S(—CH$_2$—)$_s$, (—CH$_2$—)$_r$S=O(—CH$_2$—)$_s$, (—CH$_2$—)$_r$S(O)$_2$(—CH$_2$—)$_s$, or (—CH$_2$—)$_r$NR(—CH$_2$—)$_s$. R$^{10}$ is a hydrogen atom or an alkyl, aryl, 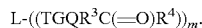 alkylaryl or arylalkyl group. R is a hydrogen atom, an alkyl group or an aryl group, q is an integer from 1 to about 7, r is an integer from 0 to about 3, s is an integer from 0 to about 3, m is an integer from 2 to about 10, p is an integer from 1 to about 10, t is an integer from 1 to about 10 and x is an integer from 1 to about 500.

In one aspect, L has a formula according to structure (I):

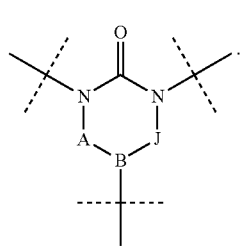

(I)

A and J are each independently a hydrogen atom, an alkyl group, an aryl group, or together with B form a cyclic ring, provided when A and J are each independently a hydrogen atom, an alkyl group, or an aryl group then B is not present, B is NR$^{11}$, O, or (—CH$_2$—)$_z$, provided when A, B and J form a ring, then A and J are (—CH$_2$—)$_z$ or C=O, R$^{11}$ is a hydrogen atom, an alkyl group, an aryl group or denotes a bond with T, each z independently is an integer from 0 to 3 and provided when either A or J is C=O, then B is NR$^{11}$, O, or (—CH$_2$—)$_z$ and z must be at least 1.

In one aspect, T is —CH$_2$—.
In another aspect, G is an oxygen atom, O.
In still another aspect, R$^3$ and R$^4$ are each individually aryl groups, which can be substituted, and m is 2.
In still yet another aspect, A and J are both C=O and B is NR$^{11}$.
In another aspect, A and J are both hydrogen atoms.
In yet another aspect, L has a formula according to structure (II):

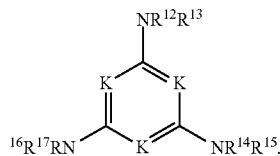

(II)

R$^{12}$, R$^{13}$, R$^{14}$, R$^{15}$, R$^{16}$, R$^{17}$ are each independently a hydrogen atom, an alkyl or aryl group or denotes a bond with T, provided at least two of R$^{12}$, R$^{13}$, R$^{14}$, R$^{15}$, R$^{16}$, R$^{17}$ are bonded with T and each K, independently is CH or N.

A fourth unique cross linking molecular family includes compounds having the formula:

L-((GTZR$^3$C(=O)R$^4$))$_m$

L is a linking group. T is (—CH$_2$—)$_x$, (—CH$_2$CH$_2$—O—)$_x$, (—CH$_2$CH$_2$CH$_2$—O—)$_x$, (—CH$_2$CH$_2$CH$_2$CH$_2$—O—)$_x$ or forms a bond. G is O, S, SO, SO$_2$, NR$^{10}$, (CH$_2$)$_t$—O— or C=O. Z can be a C=O, COO or CONH when T is (—CH$_2$—)$_x$. R$^3$ and R$^4$ are each independently an alkyl, aryl, arylalkyl, heteroaryl, or an heteroarylalkyl group, or optionally, R$^3$ and R$^4$ can be tethered together via (—CH$_2$—)$_q$, (—CH$_2$—)$_r$C=O(—CH$_2$—)$_s$, (—CH$_2$—)$_r$S(—CH$_2$—)$_s$, (—CH$_2$—)$_r$S=O(—CH$_2$—)$_s$, (—CH$_2$—)$_r$S(O)$_2$(—CH$_2$—)$_s$, or (—CH$_2$—)$_r$NR(—CH$_2$—)$_s$. R$^{10}$ is a hydrogen 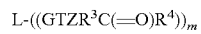

atom or an alkyl, aryl, alkylaryl or arylalkyl group. R is a hydrogen atom, an alkyl group or an aryl group, q is an integer from 1 to about 7, r is an integer from 0 to about 3, s is an integer from 0 to about 3, m is an integer from 2 to about 10, p is an integer from 1 to about 10, t is an integer from 1 to about 10 and x is an integer from 1 to about 500.

In one aspect, L has a formula according to structure (I):

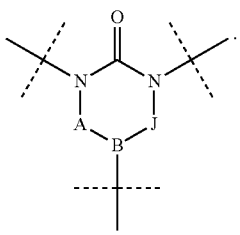

(I)

A and J are each independently a hydrogen atom, an alkyl group, an aryl group, or together with B form a cyclic ring, provided when A and J are each independently a hydrogen atom, an alkyl group, or an aryl group then B is not present, B is $NR^{11}$, O, or $(—CH_2—)_z$, provided when A, B and J form a ring, then A and J are $(—CH_2—)_z$ or C=O, $R^{11}$ is a hydrogen atom, an alkyl group, an aryl group or denotes a bond with T, each z independently is an integer from 0 to 3 and provided when either A or J is C=O, then B is $NR^{11}$, O, or $(—CH_2—)_z$ and z must be at least 1.

In one aspect, T is —$CH_2$—.

In another aspect, G is an oxygen atom, O.

In still another aspect, $R^3$ and $R^4$ are each individually aryl groups, which can be substituted, and m is 2.

In still yet another aspect, A and J are both C=O and B is $NR^{11}$.

In another aspect, A and J are both hydrogen atoms.

In yet another aspect, L has a formula according to structure (II):

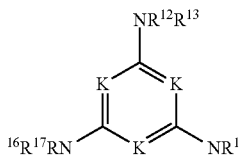

(II)

$R^{12}$, $R^{13}$, $R^{14}$, $R^{15}$, $R^{16}$, $R^{17}$ are each independently a hydrogen atom, an alkyl or aryl group or denotes a bond with T, provided at least two of $R^{12}$, $R^{13}$, $R^{14}$, $R^{15}$, $R^{16}$, $R^{17}$ are bonded with T and each K, independently is CH or N.

In still yet another aspect, compounds of the present invention provide that $R^3$ and $R^4$ are both phenyl groups and are tethered together via a CO, a S or a $CH_2$.

In yet another aspect, compounds of the present invention provide when $R^3$ and $R^4$ are both phenyl group, the phenyl groups can be substituted with at least one $CH_3OCH_2CH_2O$—.

The compositions of the invention include the crosslinkers described throughout the specification in combination with a polymer, in particular a hydrophobic polymer, and a particle having a particle size between about 1 nm to about a 25 microns, such as a porous or non-porous silica. In one embodiment, the particle has been treated with a silane.

The compositions of the invention have broad applications. The compositions can be used in surface modifications. The combination of the crosslinker, polymer, and particle, optionally treated with silane, having a size between about 1 nm to about a 25 microns, such as silica, provide hydrophobic coatings. This physical attribute provides that the compositions can be used where hydrophobic agents are favored.

The inclusion of photoreactive moieties within the compositions provides that the composition can be used with a wide range of support surfaces. The compositions can be used alone or in combination with other materials to provide a desired surface characteristic. The compositions, alone or in combination with another material, provides the treated surface having a hydrophobic surface.

While multiple embodiments are disclosed, still other embodiments of the present invention will become apparent to those skilled in the art from the following detailed description. As will be apparent, the invention is capable of modifications in various obvious aspects, all without departing from the spirit and scope of the present invention. Accordingly, the detailed descriptions are to be regarded as illustrative in nature and not restrictive.

DETAILED DESCRIPTION

The present invention surprisingly provides unique cross linking molecule families that include photoactivatable groups, that in combination with a polymer and a 1 nm to about a 25 micron sized particle, such as silica, provide hydrophobic (e.g., super hydrophobic or ultra hydrophobic) compositions that can be used to treat surfaces.

The compositions of the invention are useful as coating agents. As described throughout the specification, the compositions include a unique crosslinker, a polymer and a particle having a particle size between about 1 nm to about a 25 microns. In one embodiment, the particle has an oxide coating. In another aspect, the particle is pretreated with a silane. In still another aspect, the particle, with the oxide layer has been pretreated with a silane. The intent being that the particle exhibits some degree of hydrophobicity.

The particles include those particles having a particle size of between about 1 nm and about 25 micron sized particles that can be porous or non-porous particles derived from aluminum oxides (alumina), titanium oxide, zirconium oxide, gold (treated with thiols), silver (thiol or silane treated), nickel, iron oxide, and alloys (all treated with silane), polystyrene particles, (meth)acrylates particles, PTFE particles, silica particles, polyolefin particles, polycarbonate particles, polysiloxane particles, silicone particles, polyester particles, polyamide particles, polyurethane particles, ethylenically unsaturated polymer particles, polyanhydride particles and biodegradable particles such as polycaprolactone (PCL) and polylactideglycolide (PLGA), and nanofibers, nanotubes, or nanowires and combinations thereof. Appropriate treatments of the metals, such as gold, silver, and other nobel metals and alloys are generally include use of alkylthiols, more particularly fluoroalkylthiols.

Super hydrophobicity, and ultra hydrophobicity are defined as surfaces which have a water contact angle above 150° and 120°-150° respectively. In nature, lotus leaves are considered super hydrophobic. Water drops roll off the leaves collecting dirt along the way to give a "self-cleaning" surface. This behavior is believed to be a result of nanotextured surfaces, as well as a wax layer present on the leaf. However, super hydrophobic surfaces cannot be derived from simply coating hydrophobic or oleophobic substances on surfaces, but also require nanotexture, small protrusions on the surface giving a topography on the order of 1-1000 nm. When nanotexture is added to a hydrophobic surface, water contact angles rise from 100-120° to over 150°. Not to be limited by theory, it is believed that the nanotexture produces this effect by trapping air in the spaces between structural features. Water droplets interact with both the very small hydrophobic tips of the particles and the larger valleys between particles where only air remains. Air is also highly hydrophobic. The water contacts the particle tips and does not penetrate into the air pockets. As a result the water cannot remain still on the surface and "dances" away.

The present invention provides unique compositions and methods for preparing photocrosslinked super hydrophobic or ultra hydrophobic surfaces. Such surfaces may be useful for coatings for a variety of applications including automotive, RF coatings for satellite dishes, fabrics, filters, transportation, building materials, and others. There are few low cost methods of manufacturing super or ultra hydrophobic surfaces and these current methods generally lack durability. Introducing photoreactive crosslinkers into a polymer-particle matrix and photolyzing the crosslinker, crosslinks the matrix and greatly improves durability and use time of the coatings.

The coatings of the invention can be applied to a large variety of substrates including but not limited to plastics (polyethylene, PVC, polystyrene, polyurethane, etc), glass, wood, paper, ceramics and metals. The polymer is optimally hydrophobic (WCA>70°) and may contain reactive groups such as double bonds, but is not required to. The photocrosslinker may be hydrophobic, amphiphilic, or hydrophilic as it is added in smaller quantities. The nanoparticles should also be hydrophobic. The polymer matrix entraps the nanoparticles on the surface to give the needed nanotexture. It also provides the surface hydrophobicity.

Photopolymerization can be defined as a phenomenon whereby low molecular weight substances are joined together to create a new larger structure by way of the action of light. When light is absorbed, electrons populate excited states in molecules. These excited states are generally quite short-lived and terminate by one of three pathways. The excited state can emit a photon from either a singlet state (fluorescence) or a triplet state (phosphorescence), lose its energy via vibrations in the form on heat, or react chemically. Because the absorption of a photon highly excites a molecule, there is a much wider variety of reactions possible than standard thermochemical means. Photocrosslinking uses these reactions to link small molecules to other small molecules, large molecules to small molecules, and large molecules to each other (photocoupling of polymers), as well as large and small molecules to substrates or particles (photobonding to surfaces). During photocrosslinking each increase in molecular weight is initiated by its own photochemical reaction and the coupling of radicals can result in the formation of crosslinks, especially in the solid state. The crosslinking is generally between pre-existing polymer chains and includes polycondensation, which is also referred to as step growth polymerization. Photocrosslinking can usually be classified into two types.

The first type is where crosslinks are formed by the direct reaction of an excited molecule. Representative reactions would be a photo 2+2 cycloaddition (or 4+4) and cis-trans isomerization of double bonds. Examples of this type are demonstrated by the cyclodimerization of cinnamic acid and derivatives, chalcones and stilbenes, anthracenes, maleimides and strained cycloalkenes. In another large class of reactions, the triplet, $T_1$ excited state of carbonyl groups in ketones can result in either fragmentation (Norrish Type I reaction) or hydrogen abstraction (Norrish type II reaction). Both of these photoreactions create two radicals which can then subsequently react with surrounding molecules. For example, aromatic ketones, such as benzophenone, readily undergo hydrogen abstraction reactions with any preformed polymer possessing C—H bonds. A possible mechanism is shown in the Scheme which follows.

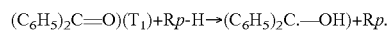

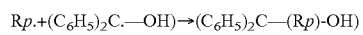

Scheme. Possible photolysis mechanism with benzophenone as an example of a non cross linking photoreactive moiety. It should be understood that incorporation of two or more photoreactive moieties, such as a benzophenone, would provide a multifunctional cross linking photoreactive group.

The second usual type of photocrosslinking is where crosslinks occur through the action of a photogenerated reactive species. Examples of the second type include the use of nitrenes that are formed from organic azides, carbenes.

Whether through direct excited state reaction or reactive intermediates, photolysis of photoreactive cross linking groups can begin a process of bond formation throughout a mixture. In most cases this will be a solid mixture of polymers, particles, and photoreactive cross linking groups designed to give a nanotextured surface. The act of cross linking will serve to increase the durability of this surface. Bonds will be formed between polymer and photoreactive cross linking group, and between polymer, photoreactive cross linking group and the surface and/or particles. Bond formation may take place by many means within the various systems. In many cases radicals are formed through photolysis. Radicals can form new bonds through radical-radical recombination, addition to unsaturated bonds, hydrogen abstraction and subsequent recombination or addition, further fragmentation, oxygen addition, or disproportionation, as well as possible electron transfer reactions. Similarly, photoreactive cross linking group and polymer can be bonded to the surface of the substrate or the particles. All of these newly formed covalent bonds increase the durability and stability of the matrix. In cases which generate carbenes and nitrenes, bonds would be formed typically by insertion, hydrogen abstraction to form radicals, rearrangements, etc. The excited states of some dienes and other unsaturated compounds may directly react with relevant groups on a polymer chain, as when cinnamic acid forms a 2+2 photoadduct with polybutadiene or other polymer (or surface) containing double bonds. The invention is not limited to these mechanisms, and in fact, many mechanisms may be at work within one polymer-particle-photoreactive cross linking group matrix.

In one embodiment the crosslinker has the formula:

L is a linking group. D is O, S, SO, $SO_2$, $NR^5$ or $CR^6R^7$. T is $(-CH_2-)_x$, $(-CH_2CH_2-O-)_x$, $(-CH_2CH_2CH_2-O-)_x$, $(-CH_2CH_2CH_2CH_2-O-)_x$ or forms a bond. $R^1$ is a hydrogen atom, an alkyl, alkyloxyalkyl, aryl, aryloxyalkyl or aryloxyaryl group. X is O, S, or $NR^8R^9$. P is a hydrogen atom or a protecting group, with the provisio that P is absent when X is $NR^8R^9$. $R^2$ is a hydrogen atom, an alkyl, alkyloxyalkyl, aryl, aryloxylalkyl or aryloxyaryl group. G is O, S, SO, $SO_2$, $NR^{10}$, $(CH_2)_t$—O— or C═O. $R^3$ and $R^4$ are each independently an alkyl, aryl, arylalkyl, heteroaryl, or a heteroarylalkyl group, or optionally, $R^3$ and $R^4$ can be tethered together via $(-CH_2-)_q$, $(-CH_2-)_rC=O(-CH_2-)_s$, $(-CH_2-)_rS(-CH_2-)_s$, $(-CH_2-)_rS=O(-CH_2-)_s$, $(-CH_2-)_rS(O)_2(-CH_2-)_s$, or $(-CH_2-)_rNR(-CH_2-)_s$. $R^5$ and $R^{10}$ are each independently a hydrogen atom or an alkyl, aryl, or arylalkyl group. $R^6$ and $R^7$ are each independently a hydrogen atom, an alkyl, aryl, arylalkyl, heteroaryl or heteroarylalkyl group. $R^8$ and $R^9$ are each independently a hydrogen atom, an alkyl, aryl, or arylalkyl group, R is a hydrogen atom, an alkyl group or an aryl group, q is an integer from 1 to about 7, r is an integer from 0 to about 3, s is an integer from 0 to about 3, m is an integer from 2 to about 10, t is an integer from 1 to about 10 and x is an integer from 1 to about 500.

In one aspect, L is a branched or unbranched alkyl chain having between about 2 and about 10 carbon atoms.

In another aspect, D is an oxygen atom (O).

In still another aspect, T is $(-CH_2-)_x$ or $(-CH_2CH_2-O-)_x$ and x is 1 or 2.

In still yet another aspect, $R^1$ is a hydrogen atom.

In yet another aspect, X is an oxygen atom, O, and P is a hydrogen atom.

In another aspect, $R^2$ is a hydrogen atom.

In still another aspect, G is an oxygen atom, O.

In still yet another aspect, $R^3$ and $R^4$ are each individually aryl groups, which can be further substituted, and m is 3.

In one particular aspect, L is

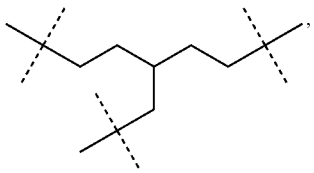

D is O, T is $(-CH_2-)_x$, $R^1$ is a hydrogen atom, X is O, P is a hydrogen atom, $R^2$ is a hydrogen atom, G is O, $R^3$ and $R^4$ are phenyl groups, m is 3 and x is 1.

In yet another particular aspect, L is $(-CH_2-)_y$, D is O, T is $(-CH_2-)_x$, $R^1$ is a hydrogen atom, X is O, P is a hydrogen atom, $R^2$ is a hydrogen atom, G is O, $R^3$ and $R^4$ are phenyl groups, m is 2, x is 1 and y is an integer from 2 to about 6, and in particular, y is 2, 4 or 6.

In certain embodiments, x is an integer from about 1 to about 500, more particularly from about 1 to about 400, from about 1 to about 250, from about 1 to about 200, from about 1 to about 150, from about 1 to about 100, from about 1 to about 50, from about 1 to about 25 or from about 1 to about 10.

In another embodiment, the crosslinker has the formula:

wherein L, T, $R^1$, X, P, $R^2$, G, $R^3$, $R^4$, $R^8$, $R^9$, $R^{10}$, R, q, r, s, m and x are as defined above.

In one aspect, L has a formula according to structure (I):

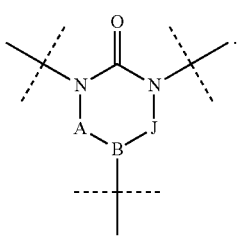

A and J are each independently a hydrogen atom, an alkyl group, an aryl group, or together with B form a cyclic ring, provided when A and J are each independently a hydrogen atom, an alkyl group, or an aryl group then B is not present, B is $NR^{11}$, O, or $(-CH_2-)_z$, provided when A, B and J form a ring, then A and J are $(-CH_2-)_z$ or C=O, $R^{11}$ is a hydrogen atom, an alkyl group, an aryl group or denotes a bond with T, each z independently is an integer from 0 to 3 and provided when either A or J is C=O, then B is $NR^{11}$, O, or $(-CH_2-)_z$ and z must be at least 1.

In another aspect T is $-CH_2-$.

In another embodiment, the family has the formula:

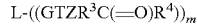

wherein L, T, G, $R^3$, $R^4$, $R^{10}$, R, q, r, s, m and x are as defined above. Z can be a C=O, COO or CONH when T is $(-CH_2-)_x$.

In one aspect, L has a formula according to structure (I):

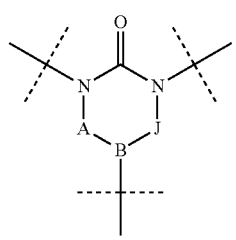

wherein A, B, J, $R^{11}$, and z are as defined above.

In another aspect, L has a formula according to structure (II):

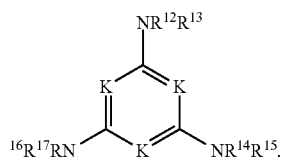

$R^{12}$, $R^{13}$, $R^{14}$, $R^{15}$, $R^{16}$, $R^{17}$ are each independently a hydrogen atom, an alkyl or aryl group or denotes a bond with T, provided at least two of $R^{12}$, $R^{13}$, $R^{14}$, $R^{15}$, $R^{16}$, $R^{17}$ are bonded with T and each K, independently is CH or N.

In another embodiment, the family has the formula:

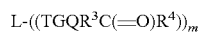

wherein L, G, $R^3$, $R^4$, $R^{10}$, R, q, r, s, m and x are as defined above. T is $(-CH_2-)_x$, $(-CH_2CH_2-O-)_x$, $(-CH_2CH_2CH_2-O-)_x$, $(-CH_2CH_2CH_2CH_2-O-)_x$ or forms a bond. Q is $(-CH_2-)_p$, $(-CH_2CH_2-O-)_p$, $(-CH_2CH_2CH_2-O-)_p$ or $(-CH_2CH_2CH_2CH_2-O-)_p$ and p is an integer from 1 to about 10.

In one aspect, L has a formula according to structure (I):

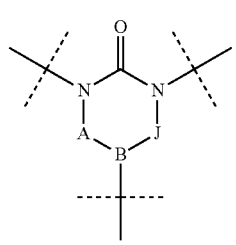

wherein A, B, J, $R^{11}$, and z are as defined above.

In another aspect, L has a formula according to structure (II):

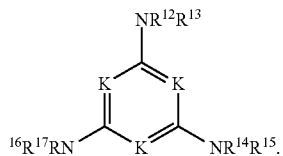
(II)

$R^{12}$, $R^{13}$, $R^{14}$, $R^{15}$, $R^{16}$, $R^{17}$ are each independently a hydrogen atom, an alkyl or aryl group or denotes a bond with T, provided at least two of $R^{12}$, $R^{13}$, $R^{14}$, $R^{15}$, $R^{16}$, $R^{17}$ are bonded with T and each K, independently is CH or N.

In still yet another aspect, compounds of the present invention provide that $R^3$ and $R^4$ are both phenyl groups and are tethered together via a CO, a S or a $CH_2$.

In yet another aspect, compounds of the present invention provide when $R^3$ and $R^4$ are phenyl groups, the phenyl groups can each independently be substituted with at least one alkyloxyalkyl group, such as $CH_3O—(CH_2CH_2O—)_n—$, or $CH_3O(—CH_2CH_2CH_2O—)_n$-a hydroxylated alkoxy group, such as $HO—CH_2CH_2O—$, $HO(—CH_2CH_2O—)_n—$ or $HO(—CH_2CH_2CH_2O—)_n—$, etc. wherein n is an integer from 1 to about 10.

In another embodiment the family has the formula:

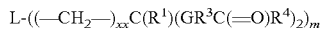

wherein L, each R, $R^1$, each G, each $R^3$, each $R^4$, each $R^{10}$, each q, each r, each s, each t and m are as defined above and xx is an integer from 1 to about 10.

In one aspect, L has a formula according to structure (I):

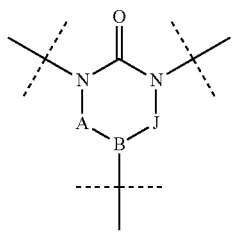
(I)

wherein A, B, J, $R^{11}$, and z are as defined above.

In another aspect, A and J are both hydrogen atoms.
In still another aspect, xx is 1.
In yet another aspect, $R^1$ is H.
In still yet another aspect, G is (—$CH_2$—)$_t$O— and t is 1.
In another aspect, $R^3$ and $R^4$ are each individually aryl groups.

In still yet another embodiment, xx is 1, $R^1$ is H, each G is (—$CH_2$—)$_t$O—, t is 1 and each of $R^3$ and $R^4$ are each individually aryl groups.

In another embodiment of the invention, the family has the formula:

where L, R, $R^1$, $R^2$, $R^3$, $R^4$, $R^8$, $R^9$, $R^{10}$, X, P, G, q, r, s, t, and m are as defined above.

In one aspect, L is

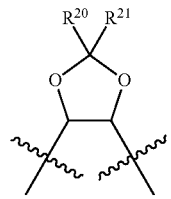

and $R^{20}$ and $R^{21}$ are each individually a hydrogen atom, an alkyl group or an aryl group.

In another aspect, $R^1$ is H.
In still another aspect, X is O.
In yet another aspect, P is H.
In still yet another aspect, $R^2$ is H.
In another aspect, G is (—$CH_2$-)tO— and t is 1.
In still another aspect, $R^3$ and $R^4$ are each individually aryl groups.

In yet another aspect, $R^1$ is H, X is O, P is H, $R^2$ is H, G is (—$CH_2$—)$_t$O—, t is 1, $R^3$ and $R^4$ are each individually aryl groups and $R^{20}$ and $R^{21}$ are both methyl groups.

In yet another embodiment, the present invention provides a family of compounds having the formula:

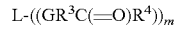

where L, G, R, $R^3$, $R^4$, $R^{10}$, q, r, s, m and t are as defined above.

In one aspect, L is

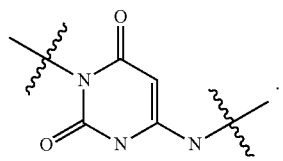 [SMILES: *Nc1cc(=O)n(*)c(=O)[nH]1]

In another aspect, G is C=O.
In still another aspect, $R^3$ and $R^4$ are each individually aryl groups.
In yet another aspect, G is C=O and $R^3$ and $R^4$ are each individually aryl groups.

In still yet another embodiment, the present invention provides a family of compounds having the formula:

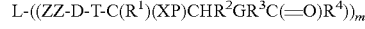

where L is as described above or CH.
T, $R^1$, X, P, $R^2$, G, $R^3$, $R^4$ and m are as described above.
ZZ is a linking group as described above for L, and in particular is an aryl or alkyl group. In particular ZZ is a phenyl group.

In one aspect, m is 3.
In another aspect, L is CH, ZZ is phenyl, D is O, T is $CH_2$, $R^1$ is H, P is H, $R^2$ is H, G is O, $R^3$ is phenyl, $R^4$ is phenyl with a —$OC_8H_{17}$ (an alkoxide) substituent and m is 3.

"Alkyl" by itself or as part of another substituent refers to a saturated or unsaturated branched, straight-chain or cyclic monovalent hydrocarbon radical having the stated number of carbon atoms (i.e., C1-C6 means one to six carbon atoms) that is derived by the removal of one hydrogen atom from a single carbon atom of a parent alkane, alkene or alkyne. Typical alkyl groups include, but are not limited to, methyl; ethyls such as ethanyl, ethenyl, ethynyl; propyls such as propan-1-yl, propan-2-yl, cyclopropan-1-yl, prop-1-en-1-yl, prop-1-en-2-yl, prop-2-en-1-yl, cycloprop-1-en-1-yl; cycloprop-2-en-1-yl, prop-1-yn-1-yl, prop-2-yn-1-yl, etc.; butyls such as butan-1-yl, butan-2-yl, 2-methyl-propan-1-yl, 2-methyl-propan-2-yl, cyclobutan-1-yl, but-1-en-1-yl, but-1-en-2-yl, 2-methyl-prop-1-en-1-yl, but-2-en-1-yl, but-2-en-2-yl, buta-1,3-dien-1-yl, buta-1,3-dien-2-yl, cyclobut-1-en-1-yl, cyclobut-1-en-3-yl, cyclobuta-1,3-dien-1-yl, but-1-yn-1-yl, but-1-yn-3-yl, but-3-yn-1-yl, etc.; and the like. Where specific levels of saturation are intended, the nomenclature "alkanyl," "alkenyl" and/or "alkynyl" is used, as defined below. "Lower alkyl" refers to alkyl groups having from 1 to 6 carbon atoms.

"Alkanyl" by itself or as part of another substituent refers to a saturated branched, straight-chain or cyclic alkyl derived by the removal of one hydrogen atom from a single carbon atom of a parent alkane. Typical alkanyl groups include, but are not limited to, methanyl; ethanyl; propanyls such as propan-1-yl, propan-2-yl (isopropyl), cyclopropan-1-yl, etc.; butanyls such as butan-1-yl, butan-2-yl (sec-butyl), 2-methyl-propan-1-yl (isobutyl), 2-methyl-propan-2-yl (t-butyl), cyclobutan-1-yl, etc.; and the like.

"Alkenyl" by itself or as part of another substituent refers to an unsaturated branched, straight-chain or cyclic alkyl having at least one carbon-carbon double bond derived by the removal of one hydrogen atom from a single carbon atom of a parent alkene. The group may be in either the cis or trans conformation about the double bond(s). Typical alkenyl groups include, but are not limited to, ethenyl; propenyls such as prop-1-en-1-yl, prop-1-en-2-yl, prop-2-en-1-yl, prop-2-en-2-yl, cycloprop-1-en-1-yl; cycloprop-2-en-1-yl; butenyls such as but-1-en-1-yl, but-1-en-2-yl, 2-methyl-prop-1-en-1-yl, but-2-en-1-yl, but-2-en-2-yl, buta-1,3-dien-1-yl, buta-1,3-dien-2-yl, cyclobut-1-en-1-yl, cyclobut-1-en-3-yl, cyclobuta-1,3-dien-1-yl, etc.; and the like.

"Alkyloxyalkyl" refers to a moiety having two alkyl groups tethered together via an oxygen bond. Suitable alkyloxyalkyl groups include polyoxyalkylenes, such as polyethyleneoxides, polypropyleneoxides, etc. that are terminated with an alkyl group, such as a methyl group. A general formula for such compounds can be depicted as R'—(OR")$_n$ or (R'O)$_n$—R" wherein n is an integer from 1 to about 10, and R' and R" are alkyl or alkylene groups.

"Alkynyl" by itself or as part of another substituent refers to an unsaturated branched, straight-chain or cyclic alkyl having at least one carbon-carbon triple bond derived by the removal of one hydrogen atom from a single carbon atom of a parent alkyne. Typical alkynyl groups include, but are not limited to, ethynyl; propynyls such as prop-1-yn-1-yl, prop-2-yn-1-yl, etc.; butynyls such as but-1-yn-1-yl, but-1-yn-3-yl, but-3-yn-1-yl, etc.; and the like.

"Alkyldiyl" by itself or as part of another substituent refers to a saturated or unsaturated, branched, straight-chain or cyclic divalent hydrocarbon group having the stated number of carbon atoms (i.e., C1-C6 means from one to six carbon atoms) derived by the removal of one hydrogen atom from each of two different carbon atoms of a parent alkane, alkene or alkyne, or by the removal of two hydrogen atoms from a single carbon atom of a parent alkane, alkene or alkyne. The two monovalent radical centers or each valency of the divalent radical center can form bonds with the same or different atoms. Typical alkyldiyl groups include, but are not limited to, methandiyl; ethyldiyls such as ethan-1,1-diyl, ethan-1,2-diyl, ethen-1,1-diyl, ethen-1,2-diyl; propyldiyls such as propan-1,1-diyl, propan-1,2-diyl, propan-2,2-diyl, propan-1,3-diyl, cyclopropan-1,1-diyl, cyclopropan-1,2-diyl, prop-1-en-1,1-diyl, prop-1-en-1,2-diyl, prop-2-en-1,2-diyl, prop-1-en-1,3-diyl, cycloprop-1-en-1,2-diyl, cycloprop-2-en-1,2-diyl, cycloprop-2-en-1,1-diyl, prop-1-yn-1,3-diyl, etc.; butyldiyls such as, butan-1,1-diyl, butan-1,2-diyl, butan-1,3-diyl, butan-1,4-diyl, butan-2,2-diyl, 2-methyl-propan-1,1-diyl, 2-methyl-propan-1,2-diyl, cyclobutan-1,1-diyl; cyclobutan-1,2-diyl, cyclobutan-1,3-diyl, but-1-en-1,1-diyl, but-1-en-1,2-diyl, but-1-en-1,3-diyl, but-1-en-1,4-diyl, 2-methyl-prop-1-en-1,1-diyl, 2-methanylidene-propan-1,1-diyl, buta-1,3-dien-1,1-diyl, buta-1,3-dien-1,2-diyl, buta-1,3-dien-1,3-diyl, buta-1,3-dien-1,4-diyl, cyclobut-1-en-1,2-diyl, cyclobut-1-en-1,3-diyl, cyclobut-2-en-1,2-diyl, cyclobuta-1,3-dien-1,2-diyl, cyclobuta-1,3-dien-1,3-diyl, but-1-yn-1,3-diyl, but-1-yn-1,4-diyl, buta-1,3-diyn-1,4-diyl, etc.; and the like. Where specific levels of saturation are intended, the nomenclature alkanyldiyl, alkenyldiyl and/or alkynyldiyl is used. Where it is specifically intended that the two valencies be on the same carbon atom, the nomenclature "alkylidene" is used. A "lower alkyldiyl" is an alkyldiyl group having from 1 to 6 carbon atoms. In preferred embodiments the alkyldiyl groups are saturated acyclic alkanyldiyl groups in which the radical centers are at the terminal carbons, e.g., methandiyl (methano); ethan-1,2-diyl (ethano); propan-1,3-diyl (propano); butan-1,4-diyl (butano); and the like (also referred to as alkylenes, defined infra).

"Alkylene" by itself or as part of another substituent refers to a straight-chain saturated or unsaturated alkyldiyl group having two terminal monovalent radical centers derived by the removal of one hydrogen atom from each of the two terminal carbon atoms of straight-chain parent alkane, alkene or alkyne. The locant of a double bond or triple bond, if present, in a particular alkylene is indicated in square brackets. Typical alkylene groups include, but are not limited to, methylene (methano); ethylenes such as ethano, etheno, ethyno; propylenes such as propano, prop[1]eno, propa[1,2]dieno, prop[1]yno, etc.; butylenes such as butano, but[1]eno, but[2]eno, buta[1,3]dieno, but[1]yno, but[2]yno, buta[1,3]diyno, etc.; and the like. Where specific levels of saturation are intended, the nomenclature alkano, alkeno and/or alkyno is used. In preferred embodiments, the alkylene group is (C1-C6) or (C1-C3) alkylene. Also preferred are straight-chain saturated alkano groups, e.g., methano, ethano, propano, butano, and the like.

"Aryl" by itself or as part of another substituent refers to a monovalent aromatic hydrocarbon group having the stated number of carbon atoms (i.e., C5-C15 means from 5 to 15 carbon atoms) derived by the removal of one hydrogen atom from a single carbon atom of a parent aromatic ring system. Typical aryl groups include, but are not limited to, groups derived from aceanthrylene, acenaphthylene, acephenanthrylene, anthracene, azulene, benzene, chrysene, coronene, fluoranthene, fluorene, hexacene, hexaphene, hexalene, as-indacene, s-indacene, indane, indene, naphthalene, octacene, octaphene, octalene, ovalene, penta-2,4-diene, pentacene, pentalene, pentaphene, perylene, phenalene, phenanthrene, picene, pleiadene, pyrene, pyranthrene, rubicene, triphenylene, trinaphthalene, and the like, as well as the various hydro isomers thereof. In preferred embodiments, the aryl group is (C5-C15) aryl, with (C5-C10) being even more preferred. Particularly preferred aryls are phenyl and naphthyl.

"Arylalkyl" by itself or as part of another substituent refers to an acyclic alkyl radical in which one of the hydrogen atoms bonded to a carbon atom, typically a terminal or sp$^3$ carbon atom, is replaced with an aryl group. Typical arylalkyl groups include, but are not limited to, benzyl, 2-phenylethan-1-yl, 2-phenylethen-1-yl, naphthylmethyl, 2-naphthylethan-1-yl, 2-naphthylethen-1-yl, naphthobenzyl, 2-naphthophenylethan-1-yl and the like. Where specific alkyl moieties are intended, the nomenclature arylalkanyl, arylalkenyl and/or arylalkynyl is used. Preferably, an arylalkyl group is (C$_7$-C$_{30}$) arylalkyl, e.g., the alkanyl, alkenyl or alkynyl moiety of the arylalkyl group is ($C_1$-$C_{10}$) and the aryl moiety is ($C_6$-$C_{20}$), more preferably, an arylalkyl group is ($C_7$-$C_{20}$) arylalkyl, e.g., the alkanyl, alkenyl or alkynyl moiety of the arylalkyl group is ($C_1$-$C_8$) and the aryl moiety is ($C_6$-$C_{12}$).

"Aryloxyalkyl" refers to a moiety having an aryl group and an alkyl group tethered together via an oxygen bond. Suitable aryloxyalkyl groups include phenyloxyalkylenes, such as methoxyphenyl, ethoxyphenyl, etc.

"Cycloalkyl" by itself or as part of another substituent refers to a cyclic version of an "alkyl" group. Typical cycloalkyl groups include, but are not limited to, cyclopropyl; cyclobutyls such as cyclobutanyl and cyclobutenyl; cyclopentyls such as cyclopentanyl and cycloalkenyl; cyclohexyls such as cyclohexanyl and cyclohexenyl; and the like.

"Cycloheteroalkyl" by itself or as part of another substituent refers to a saturated or unsaturated cyclic alkyl radical in which one or more carbon atoms (and any associated hydrogen atoms) are independently replaced with the same or different heteroatom. Typical heteroatoms to replace the carbon atom(s) include, but are not limited to, N, P, O, S, Si, etc. Where a specific level of saturation is intended, the nomenclature "cycloheteroalkanyl" or "cycloheteroalkenyl" is used. Typical cycloheteroalkyl groups include, but are not limited to, groups derived from epoxides, imidazolidine, morpholine, piperazine, piperidine, pyrazolidine, pyrrolidine, quinuclidine, and the like.

"Halogen" or "Halo" by themselves or as part of another substituent, unless otherwise stated, refer to fluoro, chloro, bromo and iodo.

"Haloalkyl" by itself or as part of another substituent refers to an alkyl group in which one or more of the hydrogen atoms are replaced with a halogen. Thus, the term "haloalkyl" is meant to include monohaloalkyls, dihaloalkyls, trihaloalkyls, etc. up to perhaloalkyls. For example, the expression "(C1-C2) haloalkyl" includes fluoromethyl, difluoromethyl, trifluoromethyl, 1-fluoroethyl, 1,1-difluoroethyl, 1,2-difluoroethyl, 1,1,1-trifluoroethyl, perfluoroethyl, etc.

"Heteroalkyl, Heteroalkynyl, Heteroalkenyl, Heteroalkynyl" by itself or as part of another substituent refer to alkyl, alkanyl, alkenyl and alkynyl radical, respectively, in which one or more of the carbon atoms (and any associated hydrogen atoms) are each independently replaced with the same or different heteroatomic groups. Typical heteroatomic groups include, but are not limited to, —O—, —S—, —O—O—, —S—S—, —O—S—, —NR'—, =N—N=, —N=N—, —N=N—NR'—, —PH—, —P(O)$_2$—, —O—P(O)$_2$—, —S(O)—, —S(O)$_2$—, —SnH$_2$— and the like, where R' is hydrogen, alkyl, substituted alkyl, cycloalkyl, substituted cycloalkyl, aryl or substituted aryl.

"Heteroaryl" by itself or as part of another substituent, refers to a monovalent heteroaromatic radical derived by the removal of one hydrogen atom from a single atom of a parent heteroaromatic ring system. Typical heteroaryl groups include, but are not limited to, groups derived from acridine, arsindole, carbazole, β-carboline, benzoxazine, benzimidazole, chromane, chromene, cinnoline, furan, imidazole, indazole, indole, indoline, indolizine, isobenzofuran, isochromene, isoindole, isoindoline, isoquinoline, isothiazole, isoxazole, naphthyridine, oxadiazole, oxazole, perimidine, phenanthridine, phenanthroline, phenazine, phthalazine, pteridine, purine, pyran, pyrazine, pyrazole, pyridazine, pyridine, pyrimidine, pyrrole, pyrrolizine, quinazoline, quinoline, quinolizine, quinoxaline, tetrazole, thiadiazole, thiazole, thiophene, triazole, xanthene, and the like. Preferably, the heteroaryl group is from 5-20 membered heteroaryl, more preferably from 5-10 membered heteroaryl. Preferred heteroaryl groups are those derived from thiophene, pyrrole, benzothiophene, benzofuran, indole, pyridine, quinoline, imidazole, oxazole and pyrazine.

"Heteroarylalkyl" by itself or as part of another substituent refers to an acyclic alkyl group in which one of the hydrogen atoms bonded to a carbon atom, typically a terminal or $sp^3$ carbon atom, is replaced with a heteroaryl group. Where specific alkyl moieties are intended, the nomenclature heteroarylalkanyl, heteroarylakenyl and/or heteroarylalkynyl is used. In preferred embodiments, the heteroarylalkyl group is a 6-21 membered heteroarylalkyl, e.g., the alkanyl, alkenyl or alkynyl moiety of the heteroarylalkyl is (C1-C6) alkyl and the heteroaryl moiety is a 5-15-membered heteroaryl. In particularly preferred embodiments, the heteroarylalkyl is a 6-13 membered heteroarylalkyl, e.g., the alkanyl, alkenyl or alkynyl moiety is (C1-C3) alkyl and the heteroaryl moiety is a 5-10 membered heteroaryl.

"Hydroxyalkyl" by itself or as part of another substituent refers to an alkyl group in which one or more of the hydrogen atoms are replaced with a hydroxyl substituent. Thus, the term "hydroxyalkyl" is meant to include monohydroxyalkyls, dihydroxyalkyls, trihydroxyalkyls, etc.

"Parent Aromatic Ring System" refers to an unsaturated cyclic or polycyclic ring system having a conjugated π electron system. Specifically included within the definition of "parent aromatic ring system" are fused ring systems in which one or more of the rings are aromatic and one or more of the rings are saturated or unsaturated, such as, for example, fluorene, indane, indene, phenalene, tetrahydronaphthalene, etc. Typical parent aromatic ring systems include, but are not limited to, aceanthrylene, acenaphthylene, acephenanthrylene, anthracene, azulene, benzene, chrysene, coronene, fluoranthene, fluorene, hexacene, hexaphene, hexalene, indacene, s-indacene, indane, indene, naphthalene, octacene, octaphene, octalene, ovalene, penta-2,4-diene, pentacene, pentalene, pentaphene, perylene, phenalene, phenanthrene, picene, pleiadene, pyrene, pyranthrene, rubicene, tetrahydronaphthalene, triphenylene, trinaphthalene, and the like, as well as the various hydro isomers thereof.

"Parent Heteroaromatic Ring System" refers to a parent aromatic ring system in which one or more carbon atoms (and any associated hydrogen atoms) are independently replaced with the same or different heteroatom. Typical heteroatoms to replace the carbon atoms include, but are not limited to, N, P, O, S, Si, etc. Specifically included within the definition of "parent heteroaromatic ring systems" are fused ring systems in which one or more of the rings are aromatic and one or more of the rings are saturated or unsaturated, such as, for example, arsindole, benzodioxan, benzofuran, chromane, chromene, indole, indoline, xanthene, etc. Typical parent heteroaromatic ring systems include, but are not limited to, arsindole, carbazole, β-carboline, chromane, chromene, cinnoline, furan, imidazole, indazole, indole, indoline, indolizine, isobenzofuran, isochromene, isoindole, isoindoline, isoquinoline, isothiazole, isoxazole, naphthyridine, oxadiazole, oxazole, perimidine, phenanthridine, phenanthroline, phenazine, phthalazine, pteridine, purine, pyran, pyrazine, pyrazole, pyridazine, pyridine, pyrimidine, pyrrole, pyrrolizine, quinazoline, quinoline, quinolizine, quinoxaline, tetrazole, thiadiazole, thiazole, thiophene, triazole, xanthene, and the like.

"Leaving group" is a group that is displaced during a reaction by a nucleophilic reagent. Suitable leaving groups include S(O)$_2$Me, —SMe or halo (e.g., F, Cl, Br, I).

"Linking group" is a group that serves as an intermediate locus between two or more end groups. The nature of the linking group can vary widely, and can include virtually any combination of atoms or groups useful for spacing one molecular moiety from another. For example, the linker may be an acyclic hydrocarbon bridge (e.g, a saturated or unsaturated alkyleno such as methano, etheno, etheno, propano, prop[1]eno, butano, but[1]eno, but[2]eno, buta[1,3]dieno, and the like), a monocyclic or polycyclic hydrocarbon bridge (e.g., [1,2]benzeno, [2,3]naphthaleno, and the like), a simple acyclic heteroatomic or heteroalkyldiyl bridge (e.g., —O—, —S—, —S—O—, —NH—, —PH—, —C(O)—, —C(O)NH—, —S(O)—, —S(O)$_2$—, —S(O)NH—, —S(O)$_2$NH—, —O—CH$_2$—, —CH$_2$—O—CH$_2$—, —O—CH=CH—CH$_2$—, and the like), a monocyclic or polycyclic heteroaryl bridge (e.g., [3,4]furano, pyridino, thiopheno, piperidino, piperazino, pyrazidino, pyrrolidino, and the like) or combinations of such bridges.

"Protecting group" is a group that is appended to, for example, a hydroxyl oxygen in place of a labile hydrogen atom. Suitable hydroxyl protecting group(s) include esters (acetate, ethylacetate), ethers (methyl, ethyl), ethoxylated derivatives (ethylene glycol, propylene glycol) and the like that can be removed under either acidic or basic conditions so that the protecting group is removed and replaced with a hydrogen atom. Guidance for selecting appropriate protecting groups, as well as synthetic strategies for their attachment and removal, may be found, for example, in Greene & Wuts, *Protective Groups in Organic Synthesis,* 3d Edition, John Wiley & Sons, Inc., New York (1999) and the references cited therein (hereinafter "Greene & Wuts").

The compositions of the invention that can be used as coating agents include one or more moieties that render the molecule hydrophobic in nature.

Photoreactive species are as described herein, and are sufficiently stable to be stored under conditions in which they retain such properties. See, e.g., U.S. Pat. No. 5,002,582, the disclosure of which is incorporated herein by reference. Latent reactive groups can be chosen that are responsive to various portions of the electromagnetic spectrum, with those responsive to ultraviolet, infrared and visible portions of the spectrum (referred to herein as "photoreactive").

Photoreactive groups respond to external stimuli and undergo active specie generation with the formation of a covalent bond to an adjacent chemical structure, e.g., as provided by the same or a different molecule. Photoreactive groups are those groups of atoms in a molecule that retain their covalent bonds during storage but, upon activation by an external energy source, form covalent bonds with other molecules.

Photoreactive groups generate active species such as free radicals and particularly nitrenes, carbenes, and excited states of ketones upon absorption of electromagnetic energy. Photoreactive groups can be chosen to be responsive to various portions of the electromagnetic spectrum, and photoreactive species that are responsive to electromagnetic radiation, including, but not limited to ultraviolet, infrared and visible portions of the spectrum, are referred to as "photochemical group" or "photogroup."

Free radical photoreactive groups can be classified by the following two types.

Type A. Compounds directly produce radicals by unimolecular fragmentation after light absorption. The radicals result from a homolytic or heterolytic cleavage of a sigma bond inside the molecule itself. Common examples include but are not limited to peroxides, and peroxy compounds, benzoin derivatives (including ketoxime esters of benzoin), acetophenone derivatives, benzilketals, α-hydroxyalkylphenones and α-aminoalkylphenones, O-acyl α-oximinoketones, acylphosphine oxides and acylphosphonates, thiobenzoic S-esters, azo and azide compounds, triazines and biimidazoles.

Type B. Compounds generate free radicals by bimolecular hydrogen abstraction after light absorption. The hydrogen abstraction photoreactive group enters an excited state and undergo an intermolecular reaction with a hydrogen donor to generate free radicals. This leads to the formation of a pair of radicals originating from two different molecules. The coupling of radicals can be used to form crosslinks, especially in the solid state in the absence of solvents. Common examples include but are not limited to the following chemical classes. Quinones, benzophenones, xanthones and thioxanthones, ketocoumarins, aromatic 1,2 diketones and phenylglyoxylates. Hydrogen abstraction reactions can also occur intramolecularly. The reactions are not effective for the direct initiation of polymerization and are used internally for the formation of an intermediate. This intermediate may be effective for further cross linking depending on its structure.

Photoreactive crosslinkers are defined as multiphotofunctional photoreactive compounds containing a minimum of two photoreactive groups that can be homo- or hetero-functional. The photocrosslinkers undergo reactions with pre-existing polymer or oligomer chains to produce crosslinks, for example, a multiphotofunctional reactive compound containing multiple benzophenone functionality. These photoreactive crosslinkers are expected to be more efficient at creating covalent bonds within a matrix. Photocrosslinkers can also crosslink polymer to the substrate surface and the surface of the particles to create a more durable matrix.

The various photoreactive groups listed above can be incorporated into moieties that have at least 2 (or more) of such photoreactive groups to afford photoreactive cross linking groups useful with the present invention. It should be understood that the photoreactive crosslinker may contain two or more types of photoreactive groups.

Bis-azido benzylidene methylcyclohexanone, (ABC), (Structure X) is an example of a multifunctional photocrosslinker based on phenyl azide that is available from Aldrich Chemicals. Many heterodifunctional-initiators capable of cross linking through a photo and a non-photo initiated mechanism are available from Pierce (Rockford, Ill.). Pierce supplies a photoreactive crosslinker that is a homodifunctional-initiator, bis-[b-(4-azidosalicylamido)ethyl]disulfide.

The photolysis of organic azides has been shown to result in N$_2$ loss, producing nitrenes as reactive intermediates. Nitrenes are known to undergo five general reactions. 1) Addition to double bonds is observed for both singlet and triplet nitrenes which in the case of arylnitrenes results in rearrangement of the aziridine to a secondary amine as a conceivable mechanism. 2) Insertion of a nitrene into a carbon-hydrogen bond to give a secondary amine which is observed for singlet nitrenes. 3) Hydrogen abstraction is the most common reaction of triplet nitrenes in solution where the formed amino radical and carbon radical generally diffuse apart and the amino radical abstracts a second hydrogen atom to give a primary amine. 4) Nitrene dimerization 5) Attack on heteroatom, for example nitrenes react with azides and oxygen.

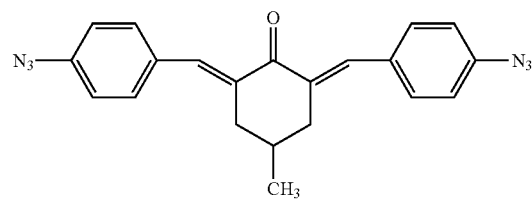 [SMILES: CC1C/C(=C\c2ccc(N=[N+]=[N-])cc2)C(=O)/C(=C/c2ccc(N=[N+]=[N-])cc2)C1]

Eight commercially available multifunctional photo-crosslinkers based on trichloromethyl triazine are available either from Aldrich Chemicals, Produits Chimiques Auxiliaires et de Syntheses, (Longjumeau, France), Shin-Nakamara Chemical, Midori Chemicals Co., Ltd. or Panchim S.A. (France). The eight compounds include 2,4,6-tris(trichloromethyl)-1,3,5 triazine, 2-(methyl)-4,6-bis(trichloromethyl)-1,3,5-triazine, 2-(4-methoxynaphthyl)-4,6-bis(trichloromethyl)-1,3,5-triazine, 2-(4-ethoxynaphthyl)-4,6-bis(trichloromethyl)-1,3,5-triazine, 4-(4-carboxylphenyl)-2,6-bis(trichloromethyl)-1,3,5-triazine, 2-(4-methoxyphenyl)-4,6-bis(trichloromethyl)-1,3,5-triazine, 2-(1-ethen-2-2'-furyl)-4,6-bis(trichloromethyl)-1,3,5-triazine and 2-(4-methoxystyryl)-4,6-bis(trichloromethyl)-1,3,5-triazine.

For example, 2-(4-Methoxystyryl)-4,6-bis(trichloromethyl)-1,3,5-triazine, (Aldrich Chemical) (Structure XI) is a type A photo initiator.

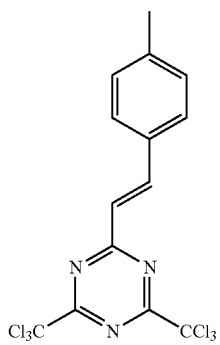

Upon direct excitation the homolytic cleavage of one of the carbon-chlorine bonds occurs yielding a radical pair. The highly reactive chlorine atom formed in this reaction abstracts a hydrogen atom to form a carbon radical and hydrogen chloride as shown in the following Scheme. The trichloromethyl triazine can serve as a photocrosslinker since it contains two reactive groups.

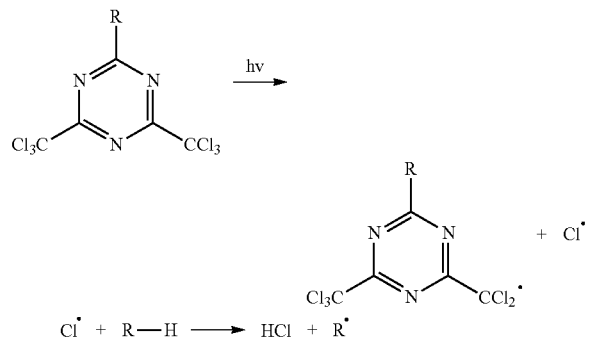

The di-azide compound (Structure X) and the triazine compound (Structure XI) were evaluated in nanostructured surfaces and the coatings were shown to have improved durability over coatings that did not contain a photocrosslinker. (See Examples)

The use of photoreactive groups in the form of photoreactive aryl ketones are useful in photoreactive crosslinkers, such as acetophenone, benzophenone, anthraquinone, anthrone, and anthrone-like heterocycles (i.e., heterocyclic analogs of anthrone such as those having N, O, or S in the 10-position), or their substituted (e.g., ring substituted) derivatives. Examples of aryl ketones include heterocyclic derivatives of anthrone, including acridone, xanthone, and thioxanthone, and their ring substituted derivatives. In particular, thioxanthone, and its derivatives, having excitation energies greater than about 360 nm are useful.

The photoreactive groups of such ketones are preferred since they are readily capable of undergoing an activation/inactivation/reactivation cycle. Benzophenone, acetophenone and anthraquinone are examples of photoreactive moieties, since they are capable of photochemical excitation with the initial formation of an excited singlet state that undergoes intersystem crossing to the triplet state. The excited triplet state can insert into carbon-hydrogen bonds by abstraction of a hydrogen atom (from a support surface, for example), thus creating a radical pair. Subsequent collapse of the radical pair leads to formation of a new carbon-carbon bond. If a reactive bond (e.g., carbon-hydrogen) is not available for bonding, the ultraviolet light-induced excitation of the benzophenone, acetophenone or anthraquinone group is reversible and the molecule returns to ground state energy level upon removal of the energy source. Photoactivatable aryl ketones such as benzophenone, anthraquinone and acetophenone are of particular importance inasmuch as these groups are subject to multiple reactivation in water and hence provide increased coating efficiency.

The compositions of the invention can be applied to a surface of interest in any suitable manner. For example, the composition can be applied by dip coating or by dispersing the compound on the surface (for example, by spray coating). Suitable methods of application include application in solution, dipping, spray coating, knife coating, and roller coating. In one aspect, the compound is applied to the surface via spray coating, as this application method provides increased density of the compound on the support surface, thereby improving durability.

Cross linking agents can be used in any suitable manner, including by the simultaneous or sequential attachment of a chemical compound to a surface. Cross linking agents of the present invention can be used to modify any suitable surface. Where the latent reactive group of the agent is a photoreactive group of the preferred type, it is particularly preferred that the surface provide abstractable hydrogen atoms suitable for covalent bonding with the activated group.

Plastics such as polyolefins, polystyrenes, poly(methyl)methacrylates, polyacrylonitriles, poly(vinylacetates), poly(vinyl alcohols), chlorine-containing polymers such as poly(vinyl)chloride, polyoxymethylenes, polycarbonates, polyamides, polyimides, polyurethanes, phenolics, amino-epoxy resins, polyesters, silicones, cellulose-based plastics, and rubber-like plastics can all be used as supports, providing surfaces that can be modified as described herein. See generally, "Plastics", pp. 462-464, in Concise Encyclopedia of Polymer Science and Engineering, Kroschwitz, ed., John Wiley and Sons, 1990, the disclosure of which is incorporated herein by reference. In addition, supports such as those formed of pyrolytic carbon, parylene coated surfaces, and silylated surfaces of glass, ceramic, or metal are suitable for surface modification.

Cross linking compounds encompassed by the present invention can be prepared by selection of an appropriate aryl group with a photoactivatable group and at least one group that can either act as a nucleophilic site or can be acted upon in a nucleophilic displacement reaction with a linking agent (L) having at least two opposing groups, either a leaving group(s) or a nucleophilic group(s). General synthetic schemes detailed below demonstrate two approaches suitable to prepare compounds of the invention.

Scheme I

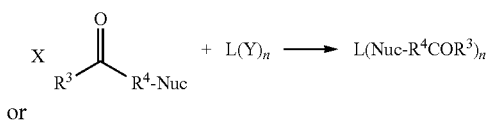

or

Scheme II

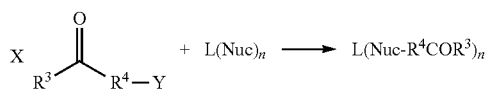

wherein X is an integer equivalent to "n" and n is an integer between 2 and about 6, $R^3$ and $R^4$ are as defined above, "Y" is a leaving group or a group that can be acted upon by a nucleophilic group, such as an ester, carboxylic acid halide, etc. and "Nuc" is a nucleophilic group, as described in further detail below. Alternatively, the reaction between "Y" and "Nuc" can be a condensation reaction, such as the reaction between, for example, a hydroxyl group and a carboxylic acid.

It should be understood in schemes I and II, that $R^3$ and $R^4$ are interchangeable.

Suitable nucleophilic groups (Nuc) include, for example, amines, hydroxyl, thiol, etc.

Suitable leaving groups, or groups susceptible to nucleophilic attack, include esters, ethers, epoxides, halides, isocyanates, isothiocyanates, sulfonyl chlorides, anhydrides, carboxylic acid halides, carboxylic acid esters, and aldehydes.

Resultant functional moieties from the reaction between the nucleophilic group and leaving (or condensation group) include, for example, esters, ethers, carbamates, thiocarbamates, sulfones, amides, ureas, thiourea, amines, sulfonamides, imines (that can be further reduced with a reducing agent such as sodium borohydride to an amine), etc.

Suitable reaction conditions for such condensations or nucleophilic displacements are known in the art. For example, hydroxyl containing moieties can be condensed with a carboxylic acid under dehydrating conditions (refluxing toluene, acid catalyst, Dean Stark trap) to form esters. Reactive halides can be displaced by hydroxyl groups under basic conditions. An isocyanate reacts with a hydroxyl group with heat to form carbamates. Likewise, an isothiocyanates reacts with a hydroxyl group to form a thiocarbamate. Under deprotonation conditions, a hydroxide ion reacts with an epoxide to form an ether linkage and forming a new hydroxyl group. Reaction between a hydroxyl and a sulfonyl chloride forms a sulfone. Reaction between a hydroxyl and an anhydride will form a ester with a carboxylic acid portion as well. Reaction between a hydroxyl group and an ester will also form an ester, with the removal of a corresponding displaced alcohol, generally under conditions that drive off the displaced alcohol.

Much like the reactions with hydroxyl groups, amines serve in similar manner. For example, an amine can react with an activated carboxylic acid for form an amide. Activation of a carboxylic acid can be facilitated by various methods in the art, including for example, use of dicyclohexylcarbodiimide (DCC) that generates urea as a side product. An isocyanate reacts with an amine to form a urea and an isothiocyanate reacts with an amine to form a thiourea.

Reaction between an amine and an epoxide will form an amine with an appended hydroxyl group from the nucleophilic displacement of the epoxide ring. Reaction between an amine and a sulfonyl chloride will form a sulfonamide. Reaction between an anhydride and an amine will afford an amide with a carboxylic portion attached to the product. Reaction between an aldehyde and an amine will form an imine which can be further reduced to an amine. Reaction between a carboxylic acid halide and an amine will form an amide, as well as the reaction between a carboxylic ester and amine. Lastly, melamine type compounds can react with an amine to form amine linkages.

Reaction conditions to form the compounds of the invention are known in the art. For example, suitable reaction conditions are described in "March's Advanced Organic Chemistry: Reactions, Mechanisms, and Structure, 5th Edition, John Wiley & Sons, Michael B. Smith & Jerry March; Fieser and Fieser's Reagents for Organic Synthesis" John Wiley & Sons, NY; Vogel's Textbook of Practical Organic Chemistry (Fifth Edition) by A. I. Vogel, B. S. Furniss, A. J. Hannaford, P. W. G. Smith, and A. R. Tatchell, Longman Scientific and Technical, Longman Group UK; and Advanced Organic Chemistry parts A and B" Third Edition, F. A. Carey, R. S. Sundberg, Plenum Press, NY, 1990, the contents of which are incorporated herein by reference in their entirety.

It should also be understood that each "Y" independently can be different. Therefore, it is possible to have reaction products that include an ether linkage as well as an ester linkage to the carbonyl containing photoactivatable group.

An exemplary non-limiting reaction is depicted in Scheme III, in which a hydroxyl group undergoes nucleophilic addition to an ester or acid halide or can undergo a condensation reaction between the hydroxyl group and a carboxylic acid.

Scheme III

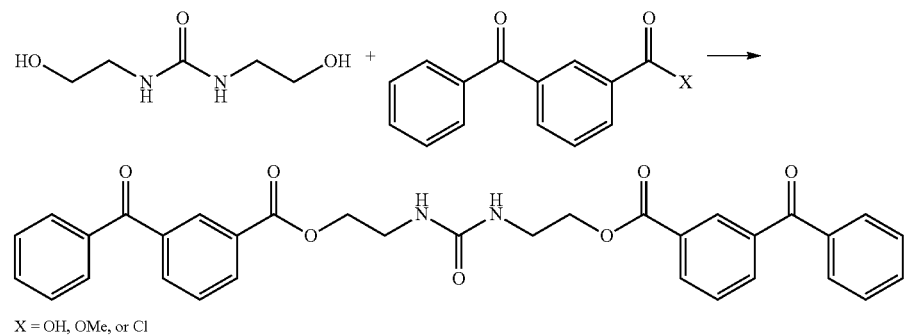

X = OH, OMe, or Cl

A second class of photocrosslinkers that undergo 2+2 cycloadditions when photolyzed can be synthesized with the following general scheme.

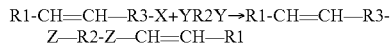

X, Y, and Z are functional groups described above as nucleophiles and leaving groups. R1 is typically substituted or unsubstituted aryl or contains substituted allylic groups or carbonyl groups which are conjugated with the main alkene. R3 is a substituted aryl or alkyl substituent which may include other functionalities such as esters, amides, ethers, etc. R2 is any linking agent, such as those shown above. Similarly, the X group may reside on the R1 component instead of the R3, giving additional photocrosslinkers.

In some cases, one arm of the photocrosslinker will be as the above alkene and one arm will be from the aryl ketone scheme described above. This may be particularly advantageous because alkene 2+2 photochemistry generally requires an additional alkene from the polymer or substrate for reaction. If a crosslinker with one alkene and one benzophenone was used, the benzophenone would be available for broad coupling to the polymer, while the alkene would be available for the more specific coupling of alkene to alkene on two crosslinkers, thus crosslinking the polymer matrix.

Other classes of photocrosslinkers include azides, trichloromethyl-substituted compounds and peroxides. A method to synthesize the bis(trichloromethyl)-1,3,5-triazine crosslinkers that contain multiple triazine groups could include of the use of 4-(4-carboxylphenyl)-2,6-bis-(trichloromethyl)-1,3,5-triazine which can be converted to the acid chloride and reacted with a linker, as described throughout.

Many methods to synthesize multifunctional azide type crosslinkers are possible. Alkyl azides are best prepared by nucleophilic displacement on alkyl halides using sodium azide. Other ways to prepare azides include reactions between hydrazines and nitrous acid, reactions of amine anions with tosyl azide, reactions of diazonium salts with sodium azide and substitution reactions with compounds containing a double bond. For the synthesis of multifunctional azide containing reagents the conversion to the azide would generally be the last step in the synthetic scheme utilizing a bifunctional or multifunctional reagent.

The synthesis of multifunctional peroxide type crosslinkers containing diacyl peroxides and acyl hydroperoxides can be prepared from compounds containing multiple functional groups such as carboxylic acids, acyl halides, or anhydrides. Mixed alkyl-acyl peroxides, (peresters) can be prepared from acyl halides and hydroperoxides, or through reaction of an acid and hydroperoxide with DCC. As with the multifunctional azide type crosslinkers, the formation of the peroxide would generally be the last step in the synthetic scheme. Multifunctional acids could serve as the core linker.

Suitable polymers useful in combination with the crosslinkers noted throughout the specification include those described in U.S. Pat. No. 6,683,126, issued Jan. 27, 2004 to Keller et al., described as binders, the contents of which are included herein in their entirety.

As described above, the particle can be virtually any type of particle that has a particle size of between about 1 nm and about 25 microns and up to 1000 nm). The particle can be porous or non-porous. Generally, the particle has an oxide layer but in particular has been treated with a silane reagent to provide hydrophobicity. Suitable materials include, but are not limited to, particles derived from aluminum oxides (alumina), titanium oxide, zirconium oxide, gold (treated with thiols), silver (thiol or silane treated), nickel, iron oxide, and alloys (all treated with silane), polystyrene particles, (meth)acrylates particles, PTFE particles, silica particles, polyolefin particles, polycarbonate particles, polysiloxane particles, silicone particles, polyester particles, polyamide particles, polyurethane particles, ethylenically unsaturated polymer particles, polyanhydride particles and biodegradable particles such as polycaprolactone (PCL) and polylactideglycolide (PLGA), and nanofibers, nanotubes, or nanowires and combinations thereof.

The particles may also be used to give properties to the surface other than hydrophobicity. For example, inclusion of silver particles may give anti-bacterial properties to the surface. Silver has long been known to have broad spectrum antimicrobial properties. The silver cation binds to thiols and other groups, denaturing proteins. When bound to proteins in the bacterial cell wall, rupture can ensue, killing the bacteria. Silver may also bind respiratory enzymes and DNA leading to further cell death. Its use in the particle aspect of these matrices may provide additional benefits beyond texture. Similarly, gold nanoparticles may give effects common to gold nanoparticles such as fluorescence quenching or surface plasmon resonance. Polymer matrix coatings may be tailored with these additional features in mind.

As noted throughout the specification, the particle can be pretreated with a silane to help increase hydrophobicity of the ultimate composition. Silanation of surfaces is known in the art. Generally, any hydrophobic silane that can react with a surface can be used with the particles described herein For example, Cab-O-Sil TS 720 (Cabot, a silica product, uses a dimethyl silicone (polydimethylsiloxane) according to the MSDS. Other silanating agents used on Cab-O-Sil products include hexamethyldisilazane and dichlorodimethylsilane. Similar silica products are available from Degussa (www.degussa.com, Duesseldorf, Germany), under their Aerosil R and LE lines that are silanated with various silane reagents, including octamethylcyclotetrasiloxane.

Not to be limited by the following, it is possible to treat uncoated particles using a solution phase reaction. A long chain alkanesilane, such as octadecyltrichlorosilane, decyltrichlorosilane, etc. can be used. The chain length can be varied from about 1 to 20, though the 18 is very common. Additionally there are aryl silanes, such as tolyldimethylchlorosilane, phenyltrichlorosilane, etc. and fluoroalkylsilanes like heptadecafluorodecyltrichlorosilane (fluorosilanes) having the same chain length range as straight alkyl chains, with complete or almost complete fluorination.

The silanes react with the particle surface through reactive groups, such as chloro groups (mono, di, and tri-chloro) or through alkoxy groups (mono-methoxy, di-methoxy, tri-methoxy or ethoxy versions typically). They can have one, two, or three chains, though it is more common to have one chain, and one or two methyl groups. Such silanes are sold commercially from Gelest Inc., Morrisville, Pa. www.gelest.com. Application procedures are found in the Gelest catalog, the contents of which are incorporated herein by reference Typically, to treat a particle with a chlorosilane, a 1-5 wt % solution is prepared in anhydrous alcohol or acetone solution. The particles are added in the same solvent, and mixed until HCl production is completed. Alkoxy silanes can be applied in a solution of 95:5 ethanol:water at pH 4-5. The silane is applied to the particles generally at a 2% concentration, stirred for a period of time, and the solvent removed. Generally, pretreated "silanated" particles are commercially available.

Any type of silica particle can be used in the compositions of the invention. The silica can be porous or non-porous and in particular can be treated with a silane to help improve hydrophobicity. Suitable silica particles are included as described in U.S. Pat. No. 6,683,126, the contents of which are included herein in their entirety.

In a first embodiment, the present invention pertains to a composition comprising a cross linking compound comprising a formula:

wherein L is a linking group;
D is O, S, SO, $SO_2$, $NR^5$ or $CR^6R^7$;
T is $(-CH_2-)_x$, $(-CH_2CH_2-O-)_x$, $(-CH_2CH_2CH_2-O-)_x$, $(-CH_2CH_2CH_2CH_2-O-)_x$ or forms a bond;
$R^1$ is a hydrogen atom, an alkyl, alkyloxyalkyl, aryl, aryloxyalkyl or aryloxyaryl group;
X is O, S, or $NR^8R^9$;
P is a hydrogen atom or a protecting group, with the provisio that P is absent when X is $NR^8R^9$;
$R^2$ is a hydrogen atom, an alkyl, alkyloxyalkyl, aryl, aryloxyalkyl or aryloxyaryl group;
G is O, S, SO, $SO_2$, $NR^{10}$, $(CH_2)_t-O-$ or C=O;
$R^3$ and $R^4$ are each independently an alkyl, aryl, arylalkyl, heteroaryl, or an heteroarylalkyl group or, optionally, $R^3$ and $R^4$ can be tethered together via $(-CH_2-)_q$, $(-CH_2-)_r$C=O$(-CH_2-)_s$, $(-CH_2-)_rS(-CH_2-)_s$, $(-CH_2-)_rS=O(-CH_2-)_s$ or $(-CH_2-)_rS(O)_2(-CH_2-)_s$, $(-CH_2-)_rNR(-CH_2-)_s$;
$R^5$ and $R^{10}$ are each independently a hydrogen atom or an alkyl, aryl or arylalkyl group;
$R^6$ and $R^7$ are each independently a hydrogen atom, an alkyl, aryl, arylalkyl, heteroaryl or heteroarylalkyl group;
$R^8$ and $R^9$ are each independently a hydrogen atom, an alkyl, aryl, or arylalkyl group;
R is a hydrogen atom, an alkyl or an aryl group;
q is an integer from 1 to about 7;
r is an integer from 0 to about 3;
s is an integer from 0 to about 3;
m is an integer from 2 to about 10;
t is an integer from 1 to about 10;
x is an integer from 1 to about 500;
a polymer; and
a particle having a particle size of between about 1 nm to about 25 microns.

In a second embodiment of the first embodiment, L is a branched or unbranched alkyl chain having between about 2 and about 10 carbon atoms.

In a third embodiment of either of the first or second embodiments, D is O.

In a fourth embodiment of any of the first through third embodiments, T is $(-CH_2-)_x$ or $(-CH_2CH_2-O-)_x$ and x is 1 or 2.

In a fifth embodiment of the any of the first through fourth embodiments, $R^1$ is a hydrogen atom.

In a sixth embodiment of any of the first through fifth embodiments, X is O and P is a hydrogen atom.

In a seventh embodiment of any of the first through the sixth embodiments, $R^2$ is a hydrogen atom.

In an eighth embodiment of any of the first through the seventh embodiments, G is O.

In a ninth embodiment of any of the first through the eighth embodiments, $R^3$ and $R^4$ are each individually aryl groups.

In a tenth embodiment of any of the first through the ninth embodiments, m is 3.

In an eleventh embodiment of the first embodiment, L is

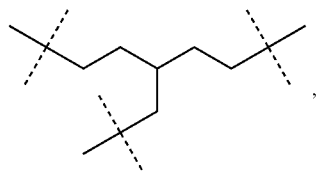

D is O, T is $(-CH_2-)_x$, $R^1$ is a hydrogen atom, X is O, P is a hydrogen atom, $R^2$ is a hydrogen atom, G is O, $R^3$ and $R^4$ are phenyl groups, m is 3 and x is 1.

In a twelfth embodiment of the first embodiment, L is $(-CH_2-)_y$, D is O, T is $(-CH_2-)_x$, $R^1$ is a hydrogen atom, X is O, P is a hydrogen atom, $R^2$ is a hydrogen atom, G is O, $R^3$ and $R^4$ are phenyl groups, m is 2, x is 1 and y is an integer from 2 to about 6.

In a thirteenth embodiment of the twelfth embodiment, y is 2, 4 or 6.

In a fourteenth embodiment, the present invention pertains to a composition comprising a cross linking compound comprising a formula:

wherein L, T, $R^1$, X, $R^8$, $R^9$, P (with the provisio that P is absent when X is $NR^8R^9$), $R^2$, G, $R^3$, $R^4$, $R^{10}$, R, q, r, s, m, t, and x are as defined above.

In a fifteenth embodiment of the fourteenth embodiment L has a formula according to structure (I):

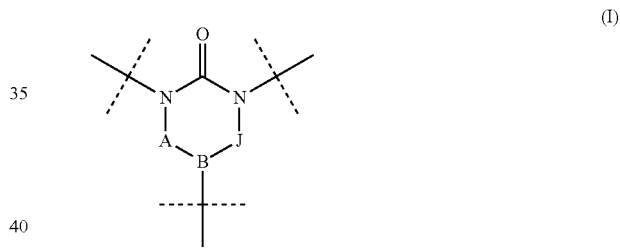

wherein A and J are each independently a hydrogen atom, an alkyl group, an aryl group, or together with B form a cyclic ring, provided when A and J are each independently a hydrogen atom, an alkyl group, or an aryl group then B is not present;
B is $NR^{11}$, O, or $(-CH_2-)_z$;
provided when A, B and J form a ring, then A and J are $(-CH_2-)_z$ or C=O;
$R^{11}$ is a hydrogen atom, an alkyl group, an aryl group or denotes a bond with T;
each z independently is an integer from 0 to 3;
provided when either A or J is C=O, then B is $NR^{11}$, O, or $(-CH_2-)_z$ and z must be at least 1;
a polymer; and
a particle having a particle size of between about 1 nm to about 25 microns.

In a sixteenth embodiment of either the fourteenth or fifteenth embodiments, T is $-CH_2-$.

In a seventeenth embodiment of any of the fourteenth through sixteenth embodiments, $R^1$ is a hydrogen atom.

In an eighteenth embodiment of any of the fourteenth through seventeenth embodiments, X is O and P is a hydrogen atom.

In a nineteenth embodiment of any of the fourteenth through eighteenth embodiments, $R^2$ is a hydrogen atom.

In a twentieth embodiment of any of the fourteenth through nineteenth embodiments, G is O.

In a twenty first embodiment of any of the fourteenth through twentieth embodiments, $R^3$ and $R^4$ are each individually aryl groups.

In a twenty second embodiment of any of the fourteenth through twenty first embodiments, m is 3.

In a twenty third embodiment of the fifteenth embodiment, A and J are both C=O and B is N.

In a twenty fourth embodiment of the fifteenth embodiment, A and J are both hydrogen atoms.

In a twenty fifth embodiment, the present invention pertains to a composition comprising a cross liking compound comprising a formula:

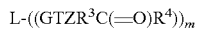

wherein Z is C=O, COO, or CONH when T $(-CH_2-)_x$; L, T, G, $R^3$, $R^4$, $R^{10}$, R, q, r, s, m, t, and x are as defined above;

a polymer; and a particle having a particle size of between about 1 nm to about 25 microns.

In a twenty sixth embodiment of the twenty fifth embodiment, L has the formula according to structure (I) as defined above.

In a twenty seventh embodiment of either the twenty fifth or twenty sixth embodiments, T is $-CH_2-$.

In a twenty eighth embodiment of any of the twenty fifth through the twenty seventh embodiments, G is O.

In a twenty ninth embodiment of any of the twenty fifth through twenty eighth embodiments, $R^3$ and $R^4$ are each individually aryl groups.

In a thirtieth embodiment of any of the twenty fifth through twenty ninth embodiments, wherein m is 2.

In a thirty first embodiment of any of the twenty sixth through thirtieth embodiments, A and J are both C=O and B is $NR^{11}$.

In a thirty second embodiment of the twenty sixth embodiment, A and J are both hydrogen atoms.

In a thirty third embodiment of the twenty fifth embodiment, L has a formula according to structure (II):

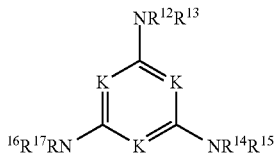

wherein $R^{12}$, $R^{13}$, $R^{14}$, $R^{15}$, $R^{16}$, $R^{17}$ are each independently a hydrogen atom, an alkyl or aryl group or denotes a bond with T, provided at least two of $R^{12}$, $R^{13}$, $R^{14}$, $R^{15}$, $R^{16}$, $R^{17}$ are bonded with T and each K, independently, is CH or N.

In a thirty fourth embodiment of the twenty fifth embodiment, L is C=O.

In a thirty fifth embodiment of the thirty fourth embodiment, G is NH.

In a thirty sixth embodiment of either the thirty fourth or thirty fifth embodiments, T is $-CH_2CH_2O-$.

In a thirty seventh embodiment of any of the thirty fourth through thirty sixth embodiments, Z is C=O.

In a thirty eighty embodiment of any of the thirty fourth through thirty seventh embodiments, $R^3$ is an aryl group.

In a thirty ninth embodiment of any of the thirty fourth through thirty eighth embodiments, $R^4$ is an aryl group.

In a fortieth embodiment, the present invention pertains to a composition comprising a cross linking compound comprising a formula:

wherein L, T, G, $R^3$, $R^3$, $R^4$, $R^{10}$, R, q, r, s, m, t and x are as defined above and Q is $(-CH_2-)_p$, $(-CH_2CH_2-O-)_p$, $(-CH_2CH_2CH_2-O-)_p$ or $(-CH_2CH_2CH_2CH_2-O-)_p$ and p is an integer from 1 to about 10;

a polymer; and a particle having a particle size of between about 1 nm to about 25 microns.

In a forty first embodiment of the fortieth embodiment, L has the formula according to structure (I) as defined above.

In a forty second embodiment if either the fortieth or forty first embodiments, T is $-CH_2-$.

In a forty third embodiment of any of the fortieth through forty second embodiments, G is O.

In a forty fourth embodiment of any of the fortieth through the forty third embodiments, $R^3$ and $R^4$ are each individually aryl groups.

In a forty fifth embodiment of any of the fortieth through forty fourth embodiments, m is 2.

In a forty sixth embodiment of any of the forty first through forty fifth embodiments, A and J are both C=O and B is $NR^{11}$.

In a forty seventh embodiment of any of the forty first through forty fifth embodiments, A and J are both hydrogen atoms.

In a forty eighth embodiment of the fortieth embodiment, L has the formula according to structure (II) as defined above.

In a forty ninth embodiment, the present invention pertains to a composition comprising a cross linking compound comprising a formula:

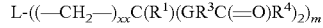

wherein L, $R^1$, G, $R^3$, $R^4$, $R^{10}$, R, q, r, s, m, t are as defined above and xx is an integer from 1 to about 10;

a polymer; and a particle having a particle size of between about 1 nm to about 25 microns.

In a fiftieth embodiment of the forty ninth embodiment, L has the formula according to structure (I) as defined above.

In a fifty first embodiment of the fiftieth embodiment, A and J are both hydrogen atoms.

In a fifty second embodiment of any of the forty ninth through fifty first embodiments, wherein xx is 1.

In a fifty third embodiment of any of the forty ninth through fifty second embodiment, wherein each $R^1$ is H.

In a fifty fourth embodiment of any of the forty ninth through fifty third embodiments, wherein each G is $(-CH_2-)_tO-$ and t is 1.

In a fifty fifth embodiment of any of the forty ninth through fifty fourth embodiments, each $R^3$ and $R^4$ are each individually aryl groups.

In a fifty sixth embodiment of any of the forty ninth through fifty fifth embodiments, wherein xx is 1, each G is $(-CH_2-)_tO-$ and t is 1, each $R^1$ is H and each $R^3$ and $R^4$ are each individually aryl groups.

In a fifty seventh embodiment, the present invention pertains to a composition comprising a cross linking compound comprising the formula:

wherein L, $R^1$, X, P, $R^8$, $R^9$, $R^2$, $R^{10}$, G, $R^3$, $R^4$, R, q, r, s, m and t are as defined as above;

a polymer; and a particle having a particle size of between about 1 nm to about 25 microns.

In a fifty eighty embodiment of the fifty seventh embodiment, L is

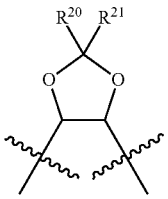

and $R^{20}$ and $R^{21}$ are each individually a hydrogen atom, an alkyl group or an aryl group.

In a fifty ninth embodiment of either the fifty seventh or fifty eighth embodiments, wherein $R^1$ is H.

In a sixtieth embodiment of any of the fifty seventh through fifty ninth embodiments, wherein X is O.

In a sixty first embodiment of any of the fifty seventh through sixtieth embodiments, P is H.

In a sixty second embodiment of any of the fifty seventh through sixty first embodiments, $R^2$ is H.

In a sixty third embodiment of any of the fifty seventh through sixty second embodiments, G is (—CH$_2$—)$_t$O— and t is 1.

In a sixty fourth embodiment of any of the fifty seventh through sixty third embodiments, $R^3$ and $R^4$ are each individually aryl groups.

In a sixty fifth embodiment of the fifty eight embodiment, $R^1$ is H, X is O, P is H, $R^2$ is H, G is (—CH$_2$—)$_t$O—, t is 1, $R^3$ and $R^4$ are each individually aryl groups and $R^{20}$ and $R^{21}$ are both methyl groups.

In a sixty sixth embodiment, the present invention pertains to a composition comprising a cross linking compound comprising the formula:

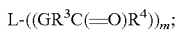

L-((GR$^3$C(═O)R$^4$))$_m$;

wherein L, G, $R^3$, $R^4$, $R^{10}$, R, q, r, s, m and t are as defined above;

a polymer; and a particle having a particle size of between about 1 nm to about 25 microns.

In a sixty seventh embodiment, L is

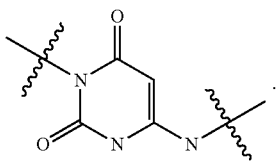 [SMILES: *Nc1cc(=O)n(*)c(=O)[nH]1]

In a sixty eighth embodiment of either the sixty sixth or sixty seventh embodiments, G is C═O.

In a sixty ninth embodiment of any of sixty sixth through sixty eighth embodiments, $R^3$ and $R^4$ are each individually aryl groups.

In a seventieth embodiment of any of the sixty sixth through sixty ninth embodiments, G is C═O and $R^3$ and $R^4$ are each individually aryl groups.

In a seventy first embodiment, the present invention pertains to a composition comprising a cross linking compound comprising a formula:

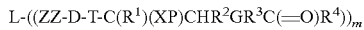

L-((ZZ-D-T-C(R$^1$)(XP)CHR$^2$GR$^3$C(═O)R$^4$))$_m$ wherein L, D, T, R$^1$, R$^5$, R$^6$, R$^7$, T, X, P, N$^8$, N$^9$, R$^2$, G, R$^{10}$, R$^3$, R$^4$, R, q, r, s, m, t, x are as defined above;

ZZ is a phenyl group;

a polymer; and a particle having a particle size of between about 1 nm to about 25 microns.

In a seventy second embodiment of the seventy first embodiment, m is 3.

In a seventy third embodiment of the seventy first or seventy second embodiments, L is CH.

In a seventy fourth embodiment of the seventy first embodiment, L is CH, ZZ is phenyl, D is O, T is CH$_2$, R$^1$ is H, P is H, R$^2$ is H, G is O, R$^3$ is phenyl, R$^4$ is phenyl substituted with a —OC$_8$H$_{17}$ and m is 3.

In a seventy fifth embodiment of any of the first through seventy fourth embodiments, R$^3$ and R$^4$ are both phenyl groups and are tethered together via a CO, a S or a CH$_2$.

In a seventy sixth embodiment of any of the first through seventy fourth embodiments, R$^3$ and R$^4$ are both phenyl groups and include at least one CH$_3$OCH$_2$CH$_2$O—.

In a seventy seventh embodiment of any of the first through seventy fourth embodiments, the particle is a porous or non-porous particle comprising aluminum oxides (alumina), titanium oxide, zirconium oxide, gold (treated with thiols), silver (thiol or silane treated), nickel, iron oxide, and alloys (all treated with silane), polystyrene particles, (meth)acrylates particles, PTFE particles, silica particles, polyolefin particles, polycarbonate particles, polysiloxane particles, silicone particles, polyester particles, polyamide particles, polyurethane particles, ethylenically unsaturated polymer particles, polyanhydride particles and biodegradable particles such as polycaprolactone (PCL) and polylactideglycolide (PLGA), and nanofibers, nanotubes, or nanowires, and combinations thereof.

In a seventy eighth embodiment of any of the first through seventy seventh embodiments, the particle is pretreated with a silane.

In a seventy ninth embodiment, the present invention pertains to a method to modify a substrate comprising the step of applying a composition of any of claims first through seventy eighth embodiments to the surface, such that the substrate surface is modified.

In an eightieth embodiment, the method of the seventy ninth embodiment is photoactivated such that at least one photoactivatable group within the composition forms a covalent bond with the surface of the substrate.

In an eighty first embodiment, the method of the seventy ninth embodiment is photoactivated such that a coating is formed from interpolymer cross linking.

In an eighty second embodiment, the present invention pertains to a super hydrophobic composition comprising a photoreactive cross linking compound, a polymer and a particle having a particle size of between about 1 nm to 25 microns. The cross linking compound is any of those described in any of the first through seventy eighth embodiments.

In an eighty third embodiment of the eighty second embodiment, the photoreactive moiety of the cross linking compound is selected from the group consisting of benzoin derivatives (including ketoxime esters of benzoin), acetophenone derivatives, benzilketals, α-hydroxyalkylphenones, α-aminoalkylphenones, O-acyl α-oximinoketones, acylphosphine oxides, acylphosphonates, thiobenzoic S-esters, azo, azide compounds, triazines, biimidazoles, quinones, benzophenones, xanthones and thioxanthones, coumarins, aromatic 1,2 diketones, peroxides, trichloromethyl substituted compounds, aryl ketones, phenyl glyoxylate and 2+2 photogroups.

In an eighty fourth embodiment, the present invention pertains to an ultra hydrophobic composition comprising a photoreactive cross linking compound, a polymer and a particle having a particle size of between about 1 nm to 25 microns.

In an eighty fifth embodiment for the eighty fourth embodiment, the photoreactive moiety of the cross linking compound is selected from the group consisting of benzoin derivatives (including ketoxime esters of benzoin), acetophenone derivatives, benzilketals, α-hydroxyalkylphenones, α-aminoalkylphenones, O-acyl α-oximinoketones, acylphosphine oxides, acylphosphonates, thiobenzoic S-esters, azo, azide compounds, triazines, biimidazoles, quinones, benzophenones, xanthones and thioxanthones, coumarins, aromatic 1,2 diketones, peroxides, trichloromethyl substituted compounds, aryl ketones and 2+2 photogroups.

The invention will be further described with reference to the following non-limiting Examples. It will be apparent to those skilled in the art that many changes can be made in the embodiments described without departing from the scope of the present invention. Thus the scope of the present invention should not be limited to the embodiments described in this application, but only by embodiments described by the language of the claims and the equivalents of those embodiments. Unless otherwise indicated, all percentages are by weight.

Example 1

Synthesis of Trifunctional Triazine Crosslinker 1.2 g (4 mmol) of triglycidyl isocyanurate (Aldrich Chemicals, Milwaukee, Wis.) and 2.4 g (12 mmol) of 4-hydroxybenzophenone (Aldrich Chemicals, Milwaukee, Wis.) were mixed in a 50-ml round bottom flask containing a magnetic stir bar. The flask was flushed with argon for 10 min and heated to 130° C. in an oil bath. Once the reaction mixture melted, 6 mg (0.02 mmol) of triphenylphosphine (Aldrich Chemicals, Milwaukee, Wis.) was added. The mixture was stirred for another 2 minutes under argon and cooled to room temperature. The reaction residue was dissolved in 30 ml chloroform, then washed with 4N NaOH (30 ml×3) and deionized water (30 ml×3). The organic layer was dried over magnesium sulfate and concentrated to dryness on the under reduced pressure. The product was purified by column chromatography (silica gel, 230-400 mesh, Whatman, Inc.) using ethyl acetate as eluent ($R_f$~4.5). The fractions containing the pure product were combined and concentrated under reduced pressure and a white powder was obtained after drying under vacuum (yield 70%).

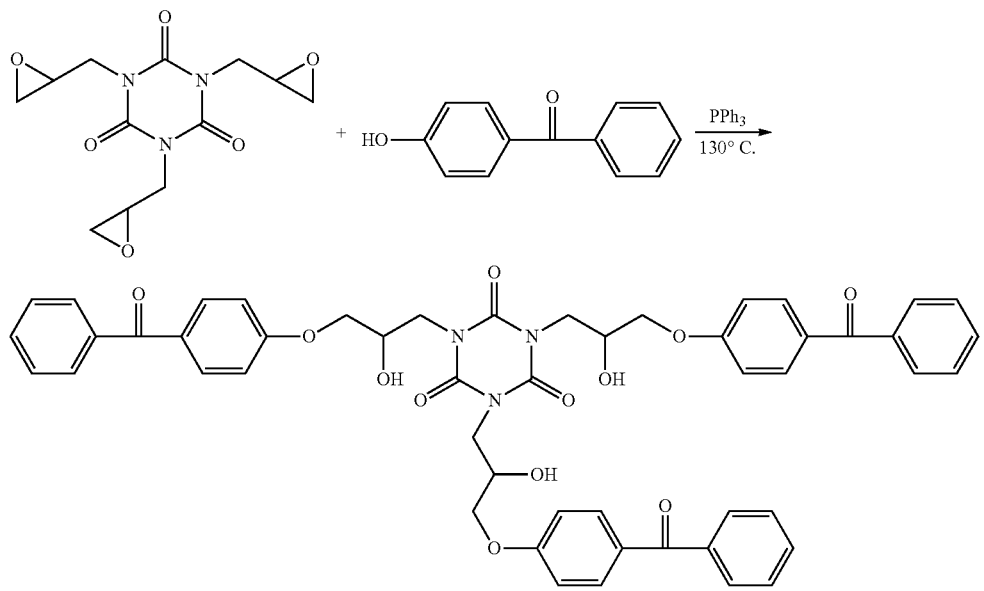

The crosslinker is soluble in most common solvents including chloroform, methylene chloride, acetone, ethyl acetate, isopropanol, etc. $^1$H NMR (CDCl$_3$) confirmed the structure of the product. The peaks at d 7.78 ppm (m, 12H), 7.46 ppm (m, 9H), 6.98 ppm (m, 6H) were the typical signals from 4-substituted benzophenone. The peak at d 4.35 ppm (m, 6H) was assigned to the protons of methylene connected to phenoxy group. The peak at d 4.13 ppm (m, 9H) was a combination of 6 protons of 3 methylene groups connected to nitrogen atom and 3 protons from 3 methine groups. The peak at d 3.00 ppm (s, 3H) corresponded to hydroxyl groups.

Example 2

Application of Triazine Crosslinker to Create a Photoreactive Surface

A photoreactive poly(ε-caprolactone) (PCL) film was prepared by incorporating the crosslinker in a film casting polymer solution. A solution containing 20 mg/ml PCL (Aldrich Chemicals, Milwaukee, Wis.) and 0.4 mg/ml triazine crosslinker (as prepared in Example 1) was cast onto a glass slide. 10 µl of 50 mg/ml polyvinylpyrrolidone) (PVP, 30K, Kollidon K30 BASF, NJ) in isopropanol solution was added onto the film. After complete evaporation of the isopropanol, the film was illuminated under UV for 20 minutes (UV Crosslinker, UVP CL-1000, Upland, Calif., 254 nm light, 120,000 µJ/cm$^2$). The coated film was incubated in deionized water on a shaker for 3 hours to remove unbound PVP. A homogeneous PVP coating could be seen on the PCL film by staining with a solution of Congo Red (0.5% w/v aqueous solution) indicating a uniform distribution of crosslinker on the film surface. A PCL film without triazine crosslinker added showed no staining, indicating all unbound PVP was removed by the rinse.

Example 3

Synthesis of Photoreactive Glycol Crosslinker 2.26 g 4-hydroxybenzophenone (Aldrich Chemicals, Milwaukee, Wis.) was dissolved in 50 ml of acetone, and 0.532 ml of glycerol triglycidyl ether (Polysciences, Warrington, Pa.), and 3.3 g potassium carbonate (Aldrich Chemicals, Milwaukee, Wis.) were added to the solution. The reaction mixture was heated to reflux over 24 hours. After 24 hours of heating, thin layer chromatography (TLC) showed consumption of the glycerol starting material (eluent 20:1 Chloroform: methanol) and the emergence of three uv active spots. The acetone was removed by rotary evaporation and the residue was dissolved in chloroform, and filtered. The resulting chloroform solution was washed three times with 4N NaOH aqueous solution, once with deionized water, then twice with 1N HCl aqueous solution, and three times again with deionized water. The chloroform solution was dried over magnesium sulfate, filtered, and the solvent removed by rotary evaporation. The resulting oil was washed three times with diethyl ether and dried. This treatment removed all 4-hydroxybenzophenone starting material, with TLC revealing the same three uv active spots. These three products presumably correspond to single, double, and triple substitution of benzophenone on the glycerol compound.

Coating Composition A 320 mg of polycaprolactone (Aldrich Chemicals, Milwaukee, Wis., Mn=80,000) and 13 mg triazine crosslinker (Example 1) were dissolved in 20 ml methylene chloride. 330 mg of CAB-O-SIL® TS-720 silica nanoparticles (Cabot Corp. Tuscola, Ill.) were dispersed in the solution with intensive vortexing. The coating composition was sprayed on a LNB surface (provided by King Controls, Bloomington, Minn.) using a commercial hair spray. After the solvent evaporated, the LNB was irradiated under UV (UVP CL-1000 Ultraviolet Crosslinker, 40 watt, 254 nm, 10 cm from light source) for 20 min.

Coating Composition B 160 mg of polybutyl methacrylate (Aldrich Chemicals, Milwaukee, Wis., Mw=337,000), 160 mg of polycaprolactone (Aldrich Chemicals, Milwaukee, Wis., Nm=80,000) and 13 mg triazine crosslinker (Example 1) were dissolved in 20 ml methylene chloride. 330 mg of CAB-O-SIL® TS-720 silica nanoparticles (Cabot Corp. Tuscola, Ill.) were dispersed in the solution with intensive vortexing. The coating composition was sprayed on a LNB surface (provided by King Controls, Bloomington, Minn.) using a commercial hair spray. After the solvent evaporated, the LNB was irradiated under UV (UVP CL-1000 Ultraviolet Crosslinker, 40 watt, 254 nm, 10 cm from light source) for 20 min.

Coating Composition C 150 mg of polystyrene (Aldrich Chemicals, Milwaukee, Wis., Mw=280,000) and 30 mg triazine crosslinker (Example 1) were dissolved in 20 ml methylene chloride. 250 mg of CAB-O-SIL® TS-720 silica nanoparticles (Cabot Corp. Tuscola, Ill.) were dispersed in the solution with intensive vortexing. The coating composition was sprayed on a LNB surface (provided by King Controls, Bloomington, Minn.) using a commercial hair spray. After the solvent evaporated, the LNB was irradiated under UV (UVP CL-1000 Ultraviolet Crosslinker, 40 watt, 254 nm, 10 cm from light source) for 20 min.

Coating Composition D 200 mg of polystyrene (Aldrich Chemicals, Milwaukee, Wis., Mw=280,000) and 40 mg triazine crosslinker (Example 1) were dissolved in 20 ml methylene chloride. 250 mg of CAB-O-SIL® TS-720 silica nanoparticles (Cabot Corp. Tuscola, Ill.) were dispersed in the solution with intensive vortexing. The coating composition was sprayed on a LNB surface (provided by King Controls, Bloomington, Minn.) using a commercial hair spray. After the solvent evaporated, the LNB was irradiated under UV (UVP CL-1000 Ultraviolet Crosslinker, 40 watt, 254 nm, 10 cm from light source) for 20 min.

Coating Composition E 130 mg of polyisobutylene (Aldrich Chemicals, Milwaukee, Wis., Mw=500,000) and 6 mg triazine crosslinker were dissolved in 20 ml THF. 156 mg of CAB-0-SM® TS-720 silica nanoparticles (Cabot Corp. Tuscola, Ill.) were dispersed in the solution with intensive vortex mixing. The coating composition was sprayed on a LNB surface (provided by King Controls, Bloomington, Minn.) using a commercial hair spray. After the solvent evaporated, the LNB was irradiated under UV (UVP CL-1000 Ultraviolet Crosslinker, 40 watt, 254 nm, 10 cm from light source) for 20 min.

Coating Composition F 133 mg of polyisobutylene (BASF Corp. Florham Park, N.J., Mw=2,000,000) and 6 mg triazine crosslinker were dissolved in 120 ml THF. 160 mg of CAB-O-SIL® TS-720 silica nanoparticles (Cabot Corp. Tuscola, Ill.) were dispersed in the solution with intensive vortex mixing. The coating composition was sprayed on a LNB surface (provided by King Controls, Bloomington, Minn.) using a commercial hair spray. After the solvent evaporated, the LNB was irradiated under UV (UVP CL-1000 Ultraviolet Crosslinker, 40 watt, 254 nm, 10 cm from light source) for 20 min.

Super Hydrophobicity Test

Coatings A, B, C, D, E and F showed comparable super hydrophobicity to a commercial super hydrophobic coating product—King's Rain Shield (King Controls, Bloomington, Minn.) with water contact angles higher than 150°. Water drops could hardly sit on the coatings.

Coating Durability Test

The durability of coatings A, B, C, D, E and F all showed Unproved durability against rub, touch and water flow compared to King's Rain Shield.

A three-month weather stability study was conducted using satellite dish LNBs provided by King Controls, Inc. The LNBs were spray coated using a formulation containing 20 mg/mL of polycaprolactone (Aldrich Chemicals, Milwaukee, Wis., Mw=80,000), 240 mg/mL CAB-O-SIL® TS-720 silica nanoparticles (Cabot Corp. Tuscola, Ill.), 0.8 mg/mL triazine crosslinker in THF, allowed to evaporate, and then irradiated with ultraviolet light (300 to 400 nm) for 5 minutes (Harland Medical UVM400, Eden Prairie, Minn.). Three LNBs were coated with a commercial water repellent product (King's Rain Shield, King Controls, Inc., Bloomington, Minn.) as control. The coated samples and controls were placed outdoors for weather exposure. At regular intervals the sample LNBs were tested using several drops of DI water to determine super hydrophobicity of the coated surface. The results showed that after eight days the commercial coatings lost super hydrophobicity whereas PCL/nanoparticle/triazine crosslinker coatings remained super hydrophobic for greater than three months.

Example 4

Synthesis of Photoreactive Glycol Crosslinker 2.26 g 4-hydroxybenzophenone (Aldrich Chemicals, Milwaukee, Wis.) was dissolved in 50 ml of acetone, and 0.532 ml of glycerol triglycidyl ether (Polysciences, Warrington, Pa.), and 3.3 g potassium carbonate (Aldrich Chemicals, Milwaukee, Wis.) were added to the solution. The reaction mixture was heated to reflux over 24 hours. After 24 hours of heating, thin layer chromatography (TLC) showed consumption of the glycerol starting material (eluent 20:1 Chloroform:methanol) and the emergence of three uv active spots. The acetone was removed by rotary evaporation and the residue was dissolved in chloroform, and filtered. The resulting chloroform solution was washed three times with 4N NaOH aqueous solution, once with deionized water, then twice with 1N HCl aqueous solution, and three times again with deionized water. The chloroform solution was dried over magnesium sulfate, filtered, and the solvent removed by rotary evaporation. The resulting oil was washed three times with diethyl ether and dried. This treatment removed all 4-hydroxybenzophenone starting material, with TLC revealing the same three uv active spots. These three products presumably correspond to single, double, and triple substitution of benzophenone on the glycerol compound.

Example 5

Diethylene Glycol Photocrosslinker Synthesis

4-Hydroxybenzophenone, 2.2758 g (11.4811 mMol, 2 mol eq, Alfa Aesar, Ward Hill, Mass.), was added to a 100 mL round bottom flask equipped with a reflux condenser and dissolved in 75 mL of acetone. Ethylene glycol diglycidyl ether, 1.0000 g (5.7405 mMol, 1 mol eq Aldrich Chemicals, Milwaukee, Wis.) followed by potassium carbonate, 3.1736 g (22.9621 mMol, 4 mol eq), was then added to the mixture and was heated at reflux overnight. After cooling, the remaining solid was filtered and organic layer was removed in vacuo. The crude product mixture was redissolved in 60 mL of chloroform and the residual 4-Hydroxybenzophenone was removed by washing with a 4N NaOH aqueous solution. The organic layer was then dried over $MgSO_4$ and filtered to remove drying agent. A portion of the chloroform solvent was removed in vacuo until 5 mL remained. The product was isolated by silica column (EMD Silica Gel 0.040-0.063 mm, 230-400 mesh, 60 Å) using (9:1) Ethyl Acetate:Hexane as eluent. Elution was monitored by TLC. $R_f$ value of desired product was 0.40 in same eluent. $^1$H NMR (CDCl$_3$): δ=7.7-7.9, 7.4-7.6, 6.9-7.1 (m, characteristic of benzophenone), 4.2-4.3 (m), 4.0-4.2 (m), 3.6-3.8 ppm (m).

Example 6

Synthesis of Urea Photo-Crosslinker

Bis-2,3-dihydroxypropylurea, 0.3000 g (1.4408 mMol, 1 mol equiv. Aldrich Chemicals, Milwaukee, Wis.), was added to a 50 mL round bottom flask under argon sweep and dissolved in 20 mL of DMF (Fisher Scientific, Pittsburgh, Pa.). Sodium hydride (60% dispersion in mineral oil, Aldrich Chemicals, Milwaukee, Wis.), 0.2305 g (5.7633 mMol, 4 mol eq), was then added and stirred at room temperature for 20 minutes. 4-(Bromomethyl)benzophenone, 1.5858 g (5.7633 mMol, 4 mol equiv. Aldrich Chemicals, Milwaukee, Wis.), was added to the mixture and heated at reflux under positive argon pressure for five hours. After cooling, the reaction mixture was dissolved in 200 mL of deionized water and the crude product was extracted with chloroform. The organic layer was then dried over magnesium sulfate and filtered to remove the drying agent. The chloroform was removed in vacuo and the crude product was redissolved in a minimal amount of (85:15) CHCl$_3$:MeOH. The product was isolated by silica gel column (EMD Silica Gel 0.040-0.063 mm, 230-400 mesh, 60 Å) using (85:15) CHCl$_3$:MeOH as eluent. Elution was monitored by TLC. $R_f$ value of desired product was 0.74 in the same eluent. Several spots were isolated together and may represent two, three, and four functionalized crosslinkers. $^1$H NMR (CDCl$_3$): δ=7.3-7.9 (m, characteristic benzophenone pattern), 4.5-4.7 (m), 3.5-3.8 ppm (m).

Example 7

Synthesis of Polyalcohol Photo-Crosslinker 3,4-O-Isopropylidene-D-mannitol, 0.5000 g (2.2498 mMol, 1 mol eq, Aldrich Chemicals, Milwaukee, Wis.), was added to a 50 mL round bottom flask equipped with a reflux condenser and dissolved in 25 mL of chloroform under argon sweep. NaH (with 60% dispersion in mineral oil, Aldrich Chemicals, Milwaukee, Wis.), 0.2700 g (6.7495 mMol, 3 mol eq), was added and then stirred for 30 minutes. 4-(Bromomethyl)benzophenone (Aldrich Chemicals, Milwaukee, Wis.), 0.1.23808 g (4.4996 mMol, 2 mol eq), was added to the mixture and heated at reflux overnight under positive argon pressure. After cooling, the organic layer was filtered to remove precipitate. A portion of the chloroform solvent was removed in vacuo until 5 mL remained. The product was isolated by silica gel column (EMD Silica Gel 0.040-0.063 mm, 230-400 mesh, 60 Å) using chloroform as eluent. Elution was monitored by TLC. $R_f$ value of desired product was 0.40 in the same eluent. Three compounds were isolated and may represent different isomers of the compound. $^1$H NMR (CDCl$_3$): δ=7.3-7.9 (m, characteristic of benzophenone pattern), 4.6-5.0 (dd), 4.5-4.6 (s), 3.6-3.9 (m), 1.5-1.6 ppm (s).

Example 8

Synthesis of Photo-Uracil Crosslinker

6-Aminouracil, 0.1091 g (0.8581 mMol, 1 mol eq, Aldrich Chemicals, Milwaukee, Wis.), was added to a 100 mL round bottom flask equipped with a reflux condenser and dissolved in 50 mL of chloroform under argon sweep. 4-(Benzoyl)benzoic acid chloride, 0.4199 g (1.7161 mMol, 2 mol eq, Aldrich Chemicals, Milwaukee, Wis.), 4-Dimethylaminopyridine, 0.01260 g (3-5 wt % of 4-(Benzoyl)benzoic acid chloride, Aldrich Chemicals, Milwaukee, Wis.), and Triethylamine, 0.1042 g (1.02969 mMol, 1.2 mol eq, Aldrich Chemicals, Milwaukee, Wis.) were heated at reflux under positive argon pressure overnight. After cooling, the reaction mixture was filtered to remove precipitate. The organic layer was removed in vacuo and the remaining crude reaction mixture was redissolved in a minimal amount of (9:1) CHCl$_3$:MeOH. The desired product was isolated by silica gel column (EMD Silica Gel 0.040-0.063 mm, 230-400 mesh, 60 Å) using the (9:1) $CHCl_3$:MeOH as eluent. Monitor elution by TLC. $R_f$ value of desired product was 0.56 in the same eluent.

Example 9

Synthesis of TOB Crosslinker 6 g of triglycidyl isocyanurate (Aldrich Chemicals, Milwaukee, Wis.) and 19.6 g of 2-hydroxy-4-(octyloxy)-benzophenone (Aldrich Chemicals, Milwaukee, Wis.) were mixed in a 50-ml round bottom flask containing a magnetic stir bar. The flask was flushed with argon for 10 min and heated to 130° C. in an oil bath. Once the reaction mixture melted, 26 mg of triphenylphosphine (Aldrich Chemicals, Milwaukee, Wis.) was added. The mixture was stirred under argon for three days and cooled to room temperature. The product was purified by column chromatography (silica gel, 230-400 mesh, Whatman, Inc.) using 18:17 ethyl acetate/hexane as eluent ($R_f$~0.66). The fractions containing the pure product were combined and concentrated under reduced pressure and a yellowish syrup was obtained after drying under vacuum (yield 68%).

The crosslinker is soluble in most common solvents including chloroform, methylene chloride, acetone, ethyl acetate, isopropanol, etc. $^1$H NMR ($CDCl_3$) confirmed the structure of the product. The peaks at 7.72 ppm, 7.40 ppm, 6.52 ppm (m, 24H) were the typical signals from benzophenone. The peak at d 4.05 ppm (m, 15H) was assigned to the protons of methylene and methine groups at the ring opening site of epoxide. The peaks 0.9-1.8 ppm (m, 45H) belonged to octyl group.

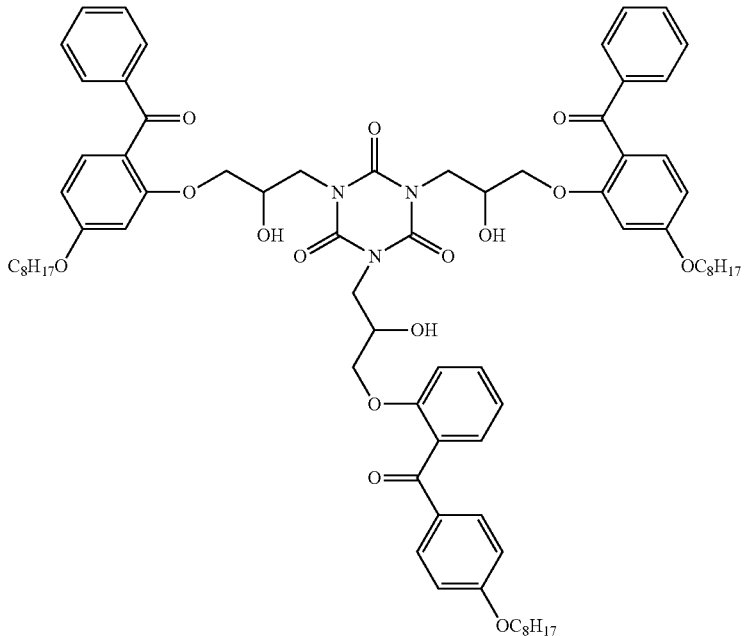

Example 10

Synthesis of BOB Crosslinker

Triphenylolmethane triglycidyl ether, 1.62 g (3.5 mMol), was added to a dry 50 mL round bottom flask, followed by the addition of 2-hydroxy-4-(octyloxy)-benzophenone, 2.88 g (8.8 mMol). Triphenylphosphine, 0.14 g (0.55 mMol), was then added and the mixture was heated at 125° C. under positive argon pressure overnight. After cooling to room temperature, the product was purified by silica gel column (EMD Silica Gel, 0.040-0.063 mm, 230-400 mesh, 60 Å) to give a pale, yellow translucent syrup. Hexane:ethyl acetate (27:20) was used as eluent. $R_f$ of desired product was 0.47 in the same eluent.

The product is soluble in most common organic solvents such as THF, IPA, $CH_2Cl_2$, $CHCl_3$, acetone and ethyl acetate and is partially soluble in hexane. $^1$H NMR ($CDCl_3$): The peaks at 7.75 ppm, 7.45 ppm, 6.55 ppm (m, 24H) were the typical signals from benzophenone. The peaks at 6.6-7.0 ppm (m, 12H) were assigned to the protons of benzene. The peaks at 3.5-4.1 ppm (m, 15H) corresponded to the protons of methylene and methine groups at the ring opening site of epoxide. The peaks 1.2-1.9 ppm (m, 45H) belonged to octyl group.

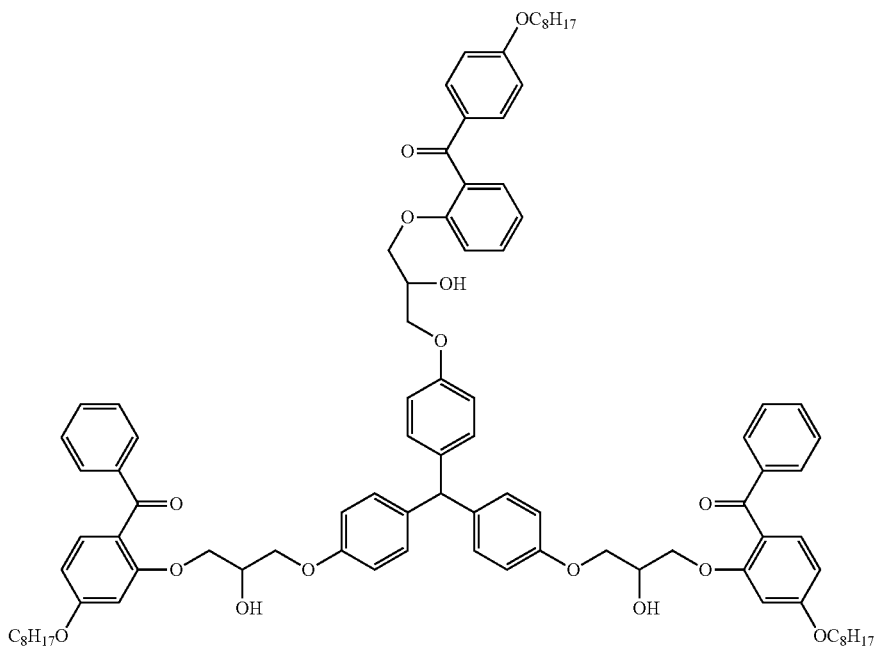

Example 11

Synthesis of TEG Crosslinker 1.94 g of tetraethylene glycol (Aldrich Chemicals, Milwaukee, Wis.) was dried under vacuum at 50° C. for 2 h and dissolved in 50 ml anhydrous tetrahydrofuran. 6.8 g of 4-(bromomethyl)benzophenone (Aldrich Chemicals, Milwaukee, Wis.) and 1.8 g sodium hydride (60% in mineral oil, Aldrich Chemicals, Milwaukee, Wis.) were added to the solution. The mixture was stirred overnight under reflux and argon protection. The reaction solution was cooled to room temperature and filtered. The filtrate was concentrated by rotary evaporation and the residue was purified by column chromatography (silica gel, 230-400 mesh, Whatman, Inc.) using 25:1 chloroform/methanol mixture as eluent. The fractions containing the pure product were combined and concentrated to dryness by rotary evaporation to yield yellowish oil (yield 80%).

The TEG crosslinker is soluble in most common solvents including chloroform, methylene chloride, tetrahydrofuran, acetone, ethyl acetate, isopropanol, etc. $^1$H NMR (CDCl$_3$) confirmed the structure of the product. The peaks at 7.49~7.79 ppm (m, 18H) were the typical signals from 4-substituted benzophenone. The peak at 4.66 ppm (s, 4H) was assigned to the protons of methylene connected to benzophenone groups. The peak at 3.70 ppm (m, 16H) corresponded to ethylene groups.

Example 12

Synthesis of HEG Crosslinker 1.70 g of hexaethylene glycol (Aldrich Chemicals, Milwaukee, Wis.) was dried under vacuum at 50° C. for 2 h and dissolved in 50 ml anhydrous tetrahydrofuran. 3.7 g of 4-(bromomethyl)benzophenone (Aldrich Chemicals, Milwaukee, Wis.) and 1.5 g sodium hydride (60% in mineral oil, Aldrich Chemicals, Milwaukee, Wis.) were added to the solution. The mixture was stirred overnight under reflux and argon protection. The reaction solution was cooled to room temperature and filtered. The filtrate was concentrated by rotary evaporation and the residue was purified by column chromatography (silica gel, 230-400 mesh, Whatman, Inc.) using 25:1 chloroform/methanol mixture as eluent. The fractions containing the pure product were combined and concentrated to dryness by rotary evaporation to provide yellowish oil (yield 70%).

The HEG crosslinker is very soluble in most common solvents including chloroform, methylene chloride, tetrahydrofuran, acetone, ethyl acetate, isopropanol, etc and slightly soluble in water. $^1$H NMR (CDCl$_3$) confirmed the structure of the product. The peaks at 7.26~7.79 ppm (m, 18H) were the typical signals from 4-substituted benzophenone. The peak at 4.64 ppm (s, 4H) was assigned to the protons of methylene connected to benzophenone groups. The peak at 3.66 ppm (m, 24H) corresponded to ethylene groups.

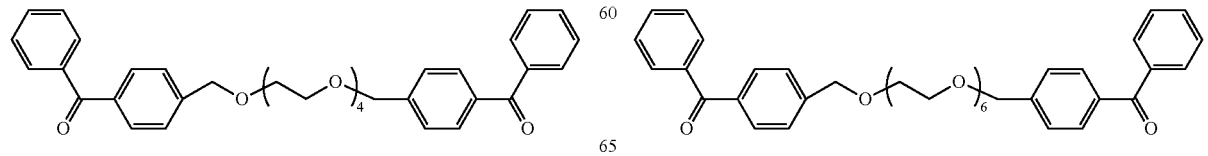

Example 13

Coating with Different Binder Polymers and Crosslinkers

Super Hydrophobic Coating with TOB Crosslinker 400 mg of polyisobutylene (BASF Corp. Florham Park, N.J., Mw=2,000,000) and 23 mg TOB crosslinker were dissolved in 60 ml THF. 480 mg of CAB-O-SIL® TS-720 silica nanoparticles (Cabot Corp. Tuscola, Ill.) were dispersed in the solution with intensive vortex mixing. N-octyltrimethoxysilane (Dow Corning, Midland, Mich.) treated glass slides were dip coated by immersing the slides in the coating solution for 30 seconds, then extracting at 0.5 cm/sec. The slides were air dried at room temperature for 5 minutes, then irradiated with ultraviolet light (300 to 400 nm) for 5 minutes (Harland Medical UVM400, Eden Prairie, Minn.).

600 mg of polycaprolactone (Aldrich Chemicals, Milwaukee, Wis., Mw=80,000) and 35 mg TOB crosslinker were dissolved in 30 ml THF, 720 mg of CAB-O-SIL® TS-720 silica nanoparticles (Cabot Corp. Tuscola, Ill.) were dispersed in the solution with intensive vortexing. N-octyltrimethoxysilane (Dow Corning, Midland, Mich.) treated glass slides were dip coated by immersing the slides in the coating solution for 30 seconds, then extracting at 0.5 cm/sec. The slides were air dried at room temperature for 5 minutes, then irradiated with ultraviolet light (300 to 400 nm) for 5 minutes (Harland Medical UVM400, Eden Prairie, Minn.).

Super Hydrophobic Coating with TEG Crosslinker 400 mg of polyisobutylene (BASF Corp. Florham Park, N.J., Mw=2,000,000) and 16 mg TEG crosslinker were dissolved in 60 ml THF. 480 mg of CAB-O-SIL® TS-720 silica nanoparticles (Cabot Corp. Tuscola, Ill.) were dispersed in the solution with intensive vortex mixing. N-octyltrimethoxysilane (Dow Corning, Midland, Mich.) treated glass slides were dip coated by immersing the slides in the coating solution for 30 seconds, then extracting at 0.5 cm/sec. The slides were air dried at room temperature for 5 minutes, then irradiated with ultraviolet light (300 to 400 nm) for 5 minutes (Harland Medical UVM400, Eden Prairie, Minn.).

600 mg of polycaprolactone (Aldrich Chemicals, Milwaukee, Wis., Mw=80,000) and 24 mg TEG crosslinker were dissolved in 30 ml THF. 480 mg of CAB-O-SIL® TS-720 silica nanoparticles (Cabot Corp. Tuscola, Ill.) were dispersed in the solution with intensive vortex mixing. N-octyltrimethoxysilane (Dow Corning, Midland, Mich.) treated glass slides were dip coated by immersing the slides in the coating solution for 30 seconds, then extracting at 0.5 cm/sec. The slides were air dried at room temperature for 5 minutes, then irradiated with ultraviolet light (300 to 400 nm) for 5 minutes (Harland Medical UVM400, Eden Prairie, Minn.).

Super Hydrophobic Coating with HEG Crosslinker 400 mg of polyisobutylene (BASF Corp. Florham Park, N.J., Mw=2,000,000) and 18 mg HEG crosslinker were dissolved in 60 ml THF. 480 mg of CAB-O-SIL® TS-720 silica nanoparticles (Cabot Corp. Tuscola, Ill.) were dispersed in the solution with intensive vortex mixing. N-octyltrimethoxysilane (Dow Corning, Midland, Mich.) treated glass slides were dip coated by immersing the slides in the coating solution for 30 seconds, then extracting at 0.5 cm/sec. The slides were air dried at room temperature for 5 minutes, then irradiated with ultraviolet light (300 to 400 nm) for 5 minutes (Harland Medical UVM400, Eden Prairie, Minn.).

600 mg of polycaprolactone (Aldrich Chemicals, Milwaukee, Wis., Mw=80,000) and 27 mg HEG crosslinker were dissolved in 30 ml THF. 480 mg of CAB-O-SIL® TS-720 silica nanoparticles (Cabot Corp. Tuscola, Ill.) were dispersed in the solution with intensive vortexing. N-octyltrimethoxysilane (Dow Corning, Midland, Mich.) treated glass slides were dip coated by immersing the slides in the coating solution for 30 seconds, then extracting at 0.5 cm/sec. The slides were air dried at room temperature for 5 minutes, then irradiated with ultraviolet light (300 to 400 nm) for 5 minutes (Harland Medical UVM400, Eden Prairie, Minn.).

Super Hydrophobic Coating with BOB Crosslinker 400 mg of polyisobutylene (BASF Corp. Florham Park, N.J., Mw=2,000,000) and 26 mg BOB crosslinker were dissolved in 60 ml THF. 480 mg of CAB-O-SIL® TS-720 silica nanoparticles (Cabot Corp. Tuscola, Ill.) were dispersed in the solution with intensive vortex mixing. N-octyltrimethoxysilane (Dow Corning, Midland, Mich.) treated glass slides were dip coated by immersing the slides in the coating solution for 30 seconds, then extracting at 0.5 cm/sec. The slides were air dried at room temperature for 5 minutes, then irradiated with ultraviolet light (300 to 400 nm) for 5 minutes (Harland Medical UVM400, Eden Prairie, Minn.).

600 mg of polycaprolactone (Aldrich Chemicals, Milwaukee, Wis., Mw=80,000) and 39 mg BOB crosslinker were dissolved in 30 ml THF. 480 mg of CAB-O-SIL® TS-720 silica nanoparticles (Cabot Corp. Tuscola, Ill.) were dispersed in the solution with intensive vortex mixing. N-octyltrimethoxysilane (Dow Corning, Midland, Mich.) treated glass slides were dip coated by immersing the slides in the coating solution for 30 seconds, then extracting at 0.5 cm/sec. The slides were air dried at room temperature for 5 minutes, then irradiated with ultraviolet light (300 to 400 nm) for 5 minutes (Harland Medical UVM400, Eden Prairie, Minn.).

Super Hydrophobic Coating with ABC Crosslinker 400 mg of polyisobutylene (BASF Corp. Florham Park, N.J., Mw=2,000,000) and 10 mg 2,6-bis(4-azidobenzylidene)-4-methylcyclohexanone (ABC, Aldrich Chemicals, Milwaukee, Wis.) were dissolved in 60 ml THF. 480 mg of CAB-O-SIL® TS-720 silica nanoparticles (Cabot Corp. Tuscola, Ill.) were dispersed in the solution with intensive vortex mixing. N-octyltrimethoxysilane (Dow Corning, Midland, Mich.) treated glass slides were dip coated by immersing the slides in the coating solution for 30 seconds, then extracting at 0.5 cm/sec. The slides were air dried at room temperature for 5 minutes, then irradiated with ultraviolet light (300 to 400 nm) for 5 minutes (Harland Medical UVM400, Eden Prairie, Minn.).

600 mg of polycaprolactone (Aldrich Chemicals, Milwaukee, Wis., Mw=80,000) and 15 mg 2,6-bis(4-azidobenzylidene)-4-methylcyclohexanone (ABC, Aldrich Chemicals, Milwaukee, Wis.) were dissolved in 30 ml THF. 480 mg of CAB-0-SIL® TS-720 silica nanoparticles (Cabot Corp. Tuscola, Ill.) were dispersed in the solution with intensive vortex mixing. N-octyltrimethoxysilane (Dow Corning, Midland, Mich.) treated glass slides were dip coated by immersing the slides in the coating solution for 30 seconds, then extracting at 0.5 cm/sec. The slides were air dried at room temperature for 5 minutes, then irradiated with ultraviolet light (300 to 400 nm) for 5 minutes (Harland Medical UVM400, Eden Prairie, Minn.).

Super Hydrophobic Coating with MBT 400 mg of polyisobutylene (BASF Corp. Florham Park, N.J., Mw=2,000,000) and 10 mg 2-(4-methoxystyryl)-4,6-bis(trichloromethyl)-1,3,5-triazine (MBT, Aldrich Chemicals, Milwaukee, Wis.) were dissolved in 60 ml THF. 480 mg of CAB-O-SIL® TS-720 silica nanoparticles (Cabot Corp. Tuscola, Ill.) were dispersed in the solution with intensive vortex mixing. N-octyltrimethoxysilane (Dow Corning, Midland, Mich.) treated glass slides were dip coated by immersing the slides in the coating solution for 30 seconds, then extracting at 0.5 cm/sec. The slides were air dried at room temperature for 5 minutes, then irradiated with ultraviolet light (300 to 400 nm) for 5 minutes (Harland Medical UVM400, Eden Prairie, Minn.).

600 mg of polycaprolactone (Aldrich Chemicals, Milwaukee, Wis., Mw=80,000) and 18 mg 2-(4-methoxystyryl)-4,6-bis(trichloromethyl)-1,3,5-triazine (MBT, Aldrich Chemicals, Milwaukee, Wis.) were dissolved in 30 ml THF. 480 mg of CAB-O-SIL® TS-720 silica nanoparticles (Cabot Corp. Tuscola, Ill.) were dispersed in the solution with intensive vortex mixing. N-octyltrimethoxysilane (Dow Corning, Midland, Mich.) treated glass slides were dip coated by immersing the slides in the coating solution for 30 seconds, then extracting at 0.5 cm/sec. The slides were air dried at room temperature for 5 minutes, then irradiated with ultraviolet light (300 to 400 nm) for 5 minutes (Harland Medical UVM400, Eden Prairie, Minn.).

Super Hydrophobicity of Coated Slides

All formulations were able to create surfaces with water contact angle greater than 150°, indicating the coatings were all super hydrophobic.

Solvent Challenging Test

The coated slides were sonicated on a probe sonicator for 1 min in THF. The slides were taken out and air dried. Water contact angles were measured on each coated surface. The results showed that all the crosslinked surfaces remained super hydrophobic after THF challenging, while the non-crosslinked (same composition without crosslinker) coatings were washed away.

Example 14

Coating with Microparticles 200 mg of polyisobutylene (BASF Corp. Florham Park, N.J., Mw=2,000,000) was dissolved in 30 ml hexane. Coating solutions with three different polymer/particle ratios were made by dispersing 100 mg, 200 mg and 400 mg of polystyrene beads (105~125 micro, Polysciences, Inc, Warrington, Pa.) in the 30 ml polyisobutylene/hexane solution with intensive vortex mixing. N-octyltrimethoxysilane (Dow Corning, Midland, Mich.) treated glass slides were dip coated by immersing the slides in the coating solution for 30 seconds, then extracting at 0.5 cm/sec. The slides were air dried at room temperature for 5 minutes and water contact angles were measured. The results showed that none of the microparticle coating formulations could create a super hydrophobic or ultra hydrophobic surface.

Example 15

Ultra Hydrophobic Coating of Fiber Membrane

A coating formulation containing 2.2 mg/ml polyisobutylene (BASF Corp. Florham Park, N.J., Mw=2,000,000), 2.6 mg/ml CAB-O-SIL® TS-720 silica nanoparticles (Cabot Corp. Tuscola, Ill.) and 0.1 mg/ml triazine crosslinker was made in tetrahydrofuran. 2×2 inch Reemay 2011 fiber membrane (BBA Fiberweb, Green Bay, Wis.) was coated by dipping the membrane in coating solution three times with 1 min interval. The membranes were air dried at room temperature for 5 min and irradiated under UV (UVP CL-1000 Ultraviolet Crosslinker, 40 watt, 254 nm, 10 cm from light source) for 20 min. Coatings without crosslinker were made as control.

Example 16

Ultra Hydrophobicity of the Coated Fiber Membrane

Both formulations (with and without triazine crosslinker) were able to create surfaces with water contact angle greater than 140° on fiber membrane, indicating the coatings were all ultra hydrophobic.

Example 17

Solvent Challenging Test of Coated Fiber Membrane

Solvent resistance of coatings with and without crosslinker was tested as follows. Coated samples were sonicated on a probe sonicator for 30 seconds in methylene chloride. After rinsing with fresh methylene chloride the samples were air dried. Water contact angles were measured on the treated samples. The results showed that the crosslinked coatings remained ultra hydrophobic while the non-crosslinked coatings lost ultra hydrophobicity after solvent challenging.

Example 18

Separation of Aqueous/Organic Mixture Using Ultra Hydrophobic Fiber Membrane

Reemay 2011 fiber membrane was coated and crosslinked as described above. The membrane was installed on the bottom of a stainless steel cylinder with an O-ring seal. 10 ml water and 10 ml methylene chloride were mixed and added on top of the coated membrane. Methylene chloride passed though the membrane successfully and completely with 10 ml water left on top of the membrane. The uncoated membrane allowed both methylene chloride and water to pass through.

Although the present invention has been described with reference to preferred embodiments, persons skilled in the art will recognize that changes may be made in form and detail without departing from the spirit and scope of the invention. All references cited throughout the specification, including those in the background, are incorporated herein in their entirety. Those skilled in the art will recognize, or be able to ascertain, using no more than routine experimentation, many equivalents to specific embodiments of the invention described specifically herein. Such equivalents are intended to be encompassed in the scope of the following claim.

What is claimed is:

1. A composition comprising a compound of formula:

wherein L is a C2 to a C6 alkyl linking group;
D is O;
G is O;
$R^3$ and $R^4$ are each independently an alkylene, arylene, arylalkylene, heteroarylene, or an heteroarylalkylene group or optionally, $R^3$ and $R^4$ can be tethered together via $(-CH_2-)_q$, $(-CH_2-)_r C=O(-CH_2-)_s$, $(-CH_2-)_rS(-CH_2-)_s$, $(-CH_2-)_rS=O(-CH_2-)_s$ or $(-CH_2-)_rS(O)_2(-CH_2-)_s$, $(-CH_2-)_rNR(-CH_2-)_s$;
and
m is an integer from 2 to about 10;
a polymer; and
a particle having a particle size of between about 1 nm to about 25 microns.

2. The composition of claim 1, wherein L is

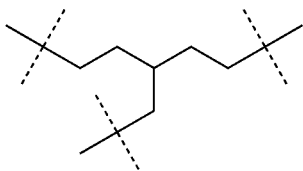

3. The composition of claim 1, wherein L is (—CH$_2$—)$_y$ and y is an integer from 2 to 6.

4. The composition of claim 1, wherein the particles are fabricated from material selected from the group of aluminum oxide, titanium oxide, zirconium oxide, gold, silver, nickel, iron oxide, and alloys, polystyrene, (meth)acrylate, PTFE, silica, polyolefin, polycarbonate, polysiloxane, silicone, polyester, polyamide, polyurethane, ethylenically unsaturated polymers, polyanhydride, polycaprolactone, polylactideglycolide, or combinations thereof.

5. The composition of claim 1, wherein the particles are selected from the group of nanofibers, nanotubes, nanowires, or combinations thereof.

6. A super hydrophobic composition comprising a photoreactive compound comprising the formula:

L-(D-CH$_2$CH(OH)CH$_2$GR$^3$C(=O)R$^4$)$_m$ as claimed in claim 1, a polymer and a particle having a particle size of between about 1 nm to about 25 microns, wherein the super hydrophobic composition has a water contact angle above 150°.

7. An ultra hydrophobic composition comprising a photoreactive compound comprising the formula:

L-(D-CH$_2$CH(OH)CH$_2$GR$^3$C(=O)R$^4$)$_m$ as claimed in claim 1, a polymer and a particle having a particle size of between about 1 nm to about 25 microns, wherein the ultra hydrophobic composition has a water contact angle in a range of 120° to 150°.

8. An article comprising a substrate and a coating composition disposed on the substrate, wherein the coating composition comprises a compound of formula:

L-(D-CH$_2$CH(OH)CH$_2$GR$^3$C(=O)R$^4$)$_m$ wherein L is a C2 to a C6 alkyl linking group;
D is O;
G is O;
R$^3$ and R$^4$ are each independently an alkylene, arylene, arylalkylene, heteroarylene, or an heteroarylalkylene group or optionally, R$^3$ and R$^4$ can be tethered together via (—CH$_2$—)$_q$, (—CH$_2$—)$_r$ C=O(—CH$_2$—)$_s$, (—CH$_2$—)$_r$S(—CH$_2$—)$_s$, (—CH$_2$—)$_r$S=O(—CH$_2$—)$_s$ or (—CH$_2$—)$_r$S(O)$_2$(—CH$_2$—)$_s$, (—CH$_2$—)$_r$NR(—CH$_2$—)$_s$;
and
m is an integer from 2 to about 10;
a polymer; and
a particle having a particle size of between about 1 nm to about 25 microns.

9. The article of claim 8, wherein the substrate is selected from the group of a plastic, a glass, a wood, a paper, a ceramic, a metal, or mixtures thereof.

10. The article of claim 9, wherein the substrate is a plastic comprising a polyolefin, polystyrene, poly(methyl)methacrylate, polyacrylonitrile, poly(vinylacetate), poly(vinyl alcohol), chlorine-containing polymer, polyoxymethylene, polycarbonate, polyamide, polyimide, polyurethane, a phenolic, an amino-epoxy resin, polyester, silicone, cellulose-based plastic, or rubber-like plastic.

11. The article of claim 8, wherein the composition exhibits a water contact angle of at least 150°.

12. A method for forming a hydrophobic coating on a surface of an article, the method comprising applying a coating composition to the substrate, the coating composition comprising:
(a) a compound of formula:

L-(D-CH$_2$CH(OH)CH$_2$GR$^3$C(=O)R$^4$)$_m$ wherein L is a C2 to a C6 alkyl linking group;
D is O;
G is O;
R$^3$ and R$^4$ are each independently an alkylene, arylene, arylalkylene, heteroarylene, or an heteroarylalkylene group or optionally, R$^3$ and R$^4$ can be tethered together via (—CH$_2$—)$_q$, (—CH$_2$—)$_r$ C=O(—CH$_2$—)$_s$, (—CH$_2$—)$_r$S(—CH$_2$—)$_s$, (—CH$_2$—)$_r$S=O(—CH$_2$—)$_s$ or (—CH$_2$—)$_r$S(O)$_2$(—CH$_2$—)$_s$, (—CH$_2$—)$_r$NR(—CH$_2$—)$_s$;
and
m is an integer from 2 to about 10;
(b) a polymer; and
(c) a particle having a particle size of between about 1 nm and about 25 microns.

13. The method of claim 12 wherein L is

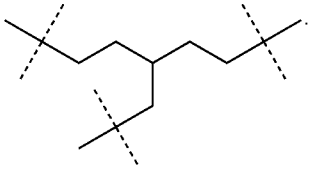

14. The method of claim 12 wherein L is (—CH$_2$—)$_y$ and y is an integer from 2 to 6.

15. The method of claim 12, wherein the compound is photoactivated such that at least one photoactivatable group within the compound forms a bond with the surface of the substrate.

16. The method of claim 12, further comprising treating the substrate and coating composition to crosslink the coating composition.

* * * * *